US012571517B2

(12) United States Patent
Dong et al.

(10) Patent No.: US 12,571,517 B2
(45) Date of Patent: Mar. 10, 2026

(54) COLOR MIXING OPTICS FOR LED ILLUMINATION DEVICE

(71) Applicant: Lutron Technology Company LLC, Coopersburg, PA (US)

(72) Inventors: Fangxu Dong, Austin, TX (US); Horace C. Ho, Austin, TX (US); David J. Knapp, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 19/025,795

(22) Filed: Jan. 16, 2025

(65) Prior Publication Data

US 2025/0155103 A1 May 15, 2025

Related U.S. Application Data

(60) Continuation of application No. 18/811,914, filed on Aug. 22, 2024, now Pat. No. 12,292,184, which is a (Continued)

(51) Int. Cl.
*F21V 5/00* (2018.01)
*F21K 9/233* (2016.01)
(Continued)

(52) U.S. Cl.
CPC .............. *F21V 5/007* (2013.01); *F21K 9/233* (2016.08); *F21V 5/004* (2013.01); (Continued)

(58) Field of Classification Search
CPC .......... F21V 5/004; F21V 5/005; F21V 5/007; F21V 7/06; F21V 7/048; F21Y 2113/10; (Continued)

(56) References Cited

U.S. PATENT DOCUMENTS

| | | | |
|---|---|---|---|
| 3,764,800 A | 10/1973 | Closterman | |
| 4,029,976 A | 6/1977 | Fish et al. | |

(Continued)

FOREIGN PATENT DOCUMENTS

| | | |
|---|---|---|
| CN | 1291282 A | 4/2001 |
| CN | 1396616 A | 2/2003 |

(Continued)

OTHER PUBLICATIONS

"Color Management of a Red, Green, and Blue LED Combinational Light Source", Avago Technologies, Mar. 2010, pp. 1-8.

(Continued)

*Primary Examiner* — Robert J May
(74) *Attorney, Agent, or Firm* — Michael S. Czarnecki; Glen R. Farbanish; Philip N. Smith

(57) ABSTRACT

Illumination devices with improved color mixing optics are disclosed herein for mixing the colors produced by a multi-colored LED emitter module to produce uniform color throughout the entire beam angle of the output light beam, along with smoother edges and improved center beam intensity. Embodiments disclosed herein include a unique arrangement of multi-color LEDs within an emitter module, a unique exit lens with different patterns of lenslets on opposing sides of the lens, and other associated optical features that thoroughly mix the different color components, and as such, provide uniform color across the output beam exiting the illumination device. Additional embodiments disclosed herein include a unique arrangement of photodetectors within the primary optics structure of the LED emitter module that ensure the optical feedback system properly measures the light produced by all similarly colored emission LEDs.

16 Claims, 9 Drawing Sheets

Related U.S. Application Data continuation of application No. 18/301,578, filed on Apr. 17, 2023, now Pat. No. 12,072,091, which is a continuation of application No. 17/739,857, filed on May 9, 2022, now Pat. No. 11,662,077, which is a continuation of application No. 17/013,214, filed on Sep. 4, 2020, now Pat. No. 11,326,761, which is a continuation of application No. 16/422,927, filed on May 24, 2019, now Pat. No. 10,767,835, which is a continuation of application No. 15/653,608, filed on Jul. 19, 2017, now Pat. No. 10,302,276, which is a division of application No. 14/505,671, filed on Oct. 3, 2014, now Pat. No. 9,736,895.

(60) Provisional application No. 61/886,471, filed on Oct. 3, 2013.

(51) Int. Cl.
*F21V 23/04* (2006.01)
*H05B 45/22* (2020.01)
*H05B 45/46* (2020.01)
*F21Y 105/10* (2016.01)
*F21Y 113/13* (2016.01)

(52) U.S. Cl.
CPC ......... *F21V 23/0457* (2013.01); *H05B 45/22* (2020.01); *H05B 45/46* (2020.01); *F21Y 2105/10* (2016.08); *F21Y 2113/13* (2016.08)

(58) Field of Classification Search
CPC .............. F21Y 2113/13; F21Y 2113/17; F21Y 2115/10; F21K 9/68; F21K 9/69; G02B 3/0043; G02B 3/0056; G02B 3/005
USPC ........................................... 362/333; 359/619
See application file for complete search history.

(56) References Cited

U.S. PATENT DOCUMENTS 4,402,090 A 8/1983 Gfeller et al.
4,713,841 A 12/1987 Porter et al.
4,745,402 A 5/1988 Auerbach
4,809,359 A 2/1989 Dockery
5,018,057 A 5/1991 Biggs et al.
5,103,466 A 4/1992 Bazes
5,181,015 A 1/1993 Marshall et al.
5,193,201 A 3/1993 Tymes
5,218,356 A 6/1993 Knapp
5,299,046 A 3/1994 Spaeth et al.
5,317,441 A 5/1994 Sidman
5,515,253 A 5/1996 Sjobom
5,541,759 A 7/1996 Neff et al.
5,619,262 A 4/1997 Uno
5,657,145 A 8/1997 Smith
5,797,085 A 8/1998 Beuk et al.
5,905,445 A 5/1999 Gurney et al.
6,016,038 A 1/2000 Mueller et al.
6,067,595 A 5/2000 Lindenstruth
6,069,929 A 5/2000 Yabe et al.
6,084,231 A 7/2000 Popat
6,094,014 A 7/2000 Bucks et al.
6,094,340 A 7/2000 Min
6,108,114 A 8/2000 Gilliland et al.
6,127,783 A 10/2000 Pashley et al.
6,147,458 A 11/2000 Bucks et al.
6,150,774 A 11/2000 Mueller et al.
6,234,645 B1 5/2001 Boerner et al.
6,234,648 B1 5/2001 Boerner et al.
6,250,774 B1 6/2001 Begemann et al.
6,333,605 B1 12/2001 Grouev et al.
6,344,641 B1 2/2002 Blalock et al.
6,356,774 B1 3/2002 Bernstein et al.
6,359,712 B1 3/2002 Kamitani
6,384,545 B1 5/2002 Lau
6,396,815 B1 5/2002 Greaves et al.
6,414,661 B1 7/2002 Shen et al.
6,441,558 B1 8/2002 Muthu et al.
6,448,550 B1 9/2002 Nishimura
6,495,964 B1 12/2002 Muthu et al.
6,498,440 B2 12/2002 Stam et al.
6,513,949 B1 2/2003 Marshall et al.
6,577,512 B2 6/2003 Tripathi et al.
6,617,795 B2 9/2003 Bruning
6,636,003 B2 10/2003 Rahm et al.
6,639,574 B2 10/2003 Scheibe
6,664,744 B2 12/2003 Dietz
6,692,136 B2 2/2004 Marshall et al.
6,741,351 B2 5/2004 Marshall et al.
6,753,661 B2 6/2004 Muthu et al.
6,788,011 B2 9/2004 Mueller et al.
6,806,659 B1 10/2004 Mueller et al.
6,831,569 B2 12/2004 Wang et al.
6,831,626 B2 12/2004 Nakamura et al.
6,853,150 B2 2/2005 Clauberg et al.
6,879,263 B2 4/2005 Pederson et al.
6,965,205 B2 11/2005 Piepgras et al.
6,969,954 B2 11/2005 Lys
6,975,079 B2 12/2005 Lys et al.
7,006,768 B1 2/2006 Franklin
7,014,336 B1 3/2006 Ducharme et al.
7,038,399 B2 5/2006 Lys et al.
7,046,160 B2 5/2006 Pederson et al.
7,072,587 B2 7/2006 Dietz et al.
7,088,031 B2 8/2006 Brantner et al.
7,119,500 B2 10/2006 Young
7,135,824 B2 11/2006 Lys et al.
7,161,311 B2 1/2007 Mueller et al.
7,166,966 B2 1/2007 Naugler, Jr. et al.
7,194,209 B1 3/2007 Robbins et al.
7,233,115 B2 6/2007 Lys
7,233,831 B2 6/2007 Blackwell
7,252,408 B2 8/2007 Mazzochette et al.
7,255,458 B2 8/2007 Ashdown
7,255,460 B2 8/2007 Lee
7,256,554 B2 8/2007 Lys
7,262,559 B2 8/2007 Tripathi et al.
7,294,816 B2 11/2007 Ng et al.
7,315,139 B1 1/2008 Selvan et al.
7,319,298 B2 1/2008 Jungwirth et al.
7,320,531 B2 1/2008 West et al.
7,329,998 B2 2/2008 Jungwirth
7,330,002 B2 2/2008 Joung
7,330,662 B2 2/2008 Zimmerman
7,352,972 B2 4/2008 Franklin
7,358,706 B2 4/2008 Lys
7,359,640 B2 4/2008 Onde et al.
7,362,320 B2 4/2008 Payne et al.
7,372,859 B2 5/2008 Hall et al.
7,400,310 B2 7/2008 Lemay
7,445,340 B2 11/2008 Conner et al.
7,484,871 B2 2/2009 Boxler
7,511,695 B2 3/2009 Furukawa et al.
7,525,611 B2 4/2009 Zagar et al.
7,554,514 B2 6/2009 Nozawa
7,573,210 B2 8/2009 Ashdown et al.
7,583,901 B2 9/2009 Nakagawa et al.
7,606,451 B2 10/2009 Morita
7,607,798 B2 10/2009 Panotopoulos
7,619,193 B2 11/2009 Deurenberg
7,649,527 B2 1/2010 Cho et al.
7,659,672 B2 2/2010 Yang
7,683,864 B2 3/2010 Lee et al.
7,701,151 B2 4/2010 Petrucci et al.
7,705,541 B2 4/2010 Wantanabe et al.
7,737,936 B2 6/2010 Daly
7,828,479 B1 11/2010 Aslan et al.
7,837,348 B2 11/2010 Narendran et al.
8,013,538 B2 9/2011 Zampini et al.
8,018,135 B2 9/2011 Van de Ven et al.
8,035,603 B2 10/2011 Furukawa et al.
8,040,299 B2 10/2011 Kretz et al.
8,044,899 B2 10/2011 Ng et al.

(56) References Cited

U.S. PATENT DOCUMENTS 8,044,918 B2 10/2011 Choi
8,057,072 B2 11/2011 Takenaka et al.
8,075,182 B2 12/2011 Dai et al.
8,076,869 B2 12/2011 Shatford et al.
8,159,150 B2 4/2012 Ashdown et al.
8,174,197 B2 5/2012 Ghanem et al.
8,174,205 B2 5/2012 Myers et al.
8,283,876 B2 10/2012 Ji
8,299,722 B2 10/2012 Melanson
8,362,707 B2 1/2013 Draper et al.
8,471,496 B2 6/2013 Knapp
8,521,035 B2 8/2013 Knapp et al.
8,556,438 B2 10/2013 Lee et al.
8,569,974 B2 10/2013 Chobot
8,595,748 B1 11/2013 Haggerty et al.
8,633,655 B2 1/2014 Kao et al.
8,653,758 B2 2/2014 Radermacher et al.
8,680,787 B2 3/2014 Veskovic
8,704,666 B2 4/2014 Baker
8,721,115 B2 5/2014 Ing et al.
8,733,981 B2 5/2014 Jiang et al.
8,740,417 B2 6/2014 Jiang et al.
8,749,172 B2 6/2014 Knapp
8,757,849 B2 * 6/2014 Brick ................ G03B 21/2033
362/333
8,773,032 B2 7/2014 May et al.
8,791,647 B2 7/2014 Kesterson et al.
8,816,600 B2 8/2014 Elder
8,911,160 B2 12/2014 Seo et al.
8,919,975 B2 12/2014 van de Ven et al.
9,316,382 B2 4/2016 Rowlette
9,332,598 B1 5/2016 Ho et al.
9,360,174 B2 6/2016 Dong et al.
9,470,406 B2 10/2016 Catalano
9,538,619 B2 1/2017 Swatsky et al.
9,736,895 B1 8/2017 Dong et al.
9,769,899 B2 9/2017 Ho et al.
10,161,786 B2 12/2018 Chang et al.
10,208,922 B2 2/2019 Gommans
10,302,276 B2 5/2019 Dong et al.
2001/0020123 A1 9/2001 Diab et al.
2001/0030668 A1 10/2001 Erten et al.
2002/0014643 A1 2/2002 Kubo et al.
2002/0033981 A1 3/2002 Keller et al.
2002/0047624 A1 4/2002 Stam et al.
2002/0049933 A1 4/2002 Nyu
2002/0134908 A1 9/2002 Johnson
2002/0138850 A1 9/2002 Basil et al.
2002/0171608 A1 11/2002 Kanai et al.
2003/0103413 A1 6/2003 Jacobi et al.
2003/0122749 A1 7/2003 Booth et al.
2003/0133491 A1 7/2003 Shih
2003/0179721 A1 9/2003 Shurmantine et al.
2004/0044709 A1 3/2004 Cabrera et al.
2004/0052076 A1 3/2004 Mueller et al.
2004/0052299 A1 3/2004 Jay et al.
2004/0136682 A1 7/2004 Watanabe
2004/0201793 A1 10/2004 Anandan et al.
2004/0220922 A1 11/2004 Lovinson et al.
2004/0257311 A1 12/2004 Kanai et al.
2005/0004727 A1 1/2005 Remboski et al.
2005/0030203 A1 2/2005 Sharp et al.
2005/0030267 A1 2/2005 Tanghe et al.
2005/0053378 A1 3/2005 Stanchfield et al.
2005/0077838 A1 4/2005 Blurnel
2005/0110777 A1 5/2005 Geaghan et al.
2005/0117190 A1 6/2005 Iwauchi et al.
2005/0169643 A1 8/2005 Franklin
2005/0200292 A1 9/2005 Naugler et al.
2005/0207157 A1 9/2005 Tani
2005/0242742 A1 11/2005 Cheang et al.
2005/0265731 A1 12/2005 Keum et al.
2006/0145887 A1 7/2006 Mcmahon
2006/0164291 A1 7/2006 Gunnarsson
2006/0198463 A1 9/2006 Godin
2006/0220990 A1 10/2006 Coushaine et al.
2006/0227085 A1 10/2006 Boldt et al.
2006/0267037 A1 11/2006 Lim et al.
2007/0040512 A1 2/2007 Jungwirth et al.
2007/0109239 A1 5/2007 Den et al.
2007/0132592 A1 6/2007 Stewart et al.
2007/0139957 A1 6/2007 Haim et al.
2007/0200121 A1 8/2007 Lankhorst et al.
2007/0248180 A1 10/2007 Bowman et al.
2007/0254694 A1 11/2007 Nakagawa et al.
2007/0268694 A1 11/2007 Bailey et al.
2007/0279346 A1 12/2007 Den et al.
2008/0061717 A1 3/2008 Bogner et al.
2008/0107029 A1 5/2008 Hall et al.
2008/0120559 A1 5/2008 Yee
2008/0136334 A1 6/2008 Robinson et al.
2008/0136770 A1 6/2008 Ferentz et al.
2008/0136771 A1 6/2008 Chen et al.
2008/0150864 A1 6/2008 Bergquist
2008/0186898 A1 8/2008 Petite
2008/0222367 A1 9/2008 Co
2008/0235418 A1 9/2008 Werthen et al.
2008/0253766 A1 10/2008 Yu et al.
2008/0265799 A1 10/2008 Sibert
2008/0297070 A1 12/2008 Kuenzler et al.
2008/0304833 A1 12/2008 Zheng
2008/0309255 A1 12/2008 Myers et al.
2008/0317475 A1 12/2008 Pederson et al.
2009/0026978 A1 1/2009 Robinson
2009/0040154 A1 2/2009 Scheibe
2009/0049295 A1 2/2009 Erickson et al.
2009/0051496 A1 2/2009 Pahlavan et al.
2009/0121238 A1 5/2009 Peck
2009/0168414 A1 7/2009 Bailey
2009/0171571 A1 7/2009 Son et al.
2009/0196282 A1 8/2009 Fellman et al.
2009/0245101 A1 10/2009 Kwon et al.
2009/0278789 A1 11/2009 Declercq et al.
2009/0284511 A1 11/2009 Takasugi et al.
2009/0303972 A1 12/2009 Flammer et al.
2010/0005533 A1 1/2010 Shamir
2010/0054748 A1 3/2010 Sato
2010/0061734 A1 3/2010 Knapp
2010/0096447 A1 4/2010 Kwon et al.
2010/0103660 A1 4/2010 Van de Ven et al.
2010/0134021 A1 6/2010 Ayres
2010/0134024 A1 6/2010 Brandes
2010/0141159 A1 6/2010 Shiu et al.
2010/0182294 A1 7/2010 Roshan et al.
2010/0188443 A1 7/2010 Lewis et al.
2010/0188972 A1 7/2010 Knapp
2010/0194299 A1 8/2010 Ye et al.
2010/0213856 A1 8/2010 Mizusako
2010/0272437 A1 10/2010 Yoon et al.
2010/0290234 A1 11/2010 Bierhuizen et al.
2010/0301777 A1 12/2010 Kraemer
2010/0327764 A1 12/2010 Knapp
2011/0031894 A1 2/2011 Van de Ven
2011/0044343 A1 2/2011 Sethuram et al.
2011/0052214 A1 3/2011 Shimada et al.
2011/0062874 A1 3/2011 Knapp
2011/0063214 A1 3/2011 Knapp
2011/0063268 A1 3/2011 Knapp
2011/0068699 A1 3/2011 Knapp
2011/0069094 A1 3/2011 Knapp
2011/0069960 A1 3/2011 Knapp et al.
2011/0121749 A1 5/2011 Kubis
2011/0133654 A1 6/2011 Mckenzie et al.
2011/0140999 A1 6/2011 Beland et al.
2011/0148315 A1 6/2011 Van der Veen et al.
2011/0150028 A1 6/2011 Nguyen et al.
2011/0248640 A1 10/2011 Welten
2011/0253915 A1 10/2011 Knapp
2011/0299854 A1 12/2011 Jonsson et al.
2011/0309754 A1 12/2011 Ashdown et al.
2012/0056545 A1 3/2012 Radermacher et al.
2012/0104426 A1 5/2012 Chan et al.
2012/0153839 A1 6/2012 Farley et al.
2012/0229032 A1 9/2012 Van de Ven et al.

(56) References Cited

U.S. PATENT DOCUMENTS

| | | | |
|---|---|---|---|
| 2012/0299481 | A1 | 11/2012 | Stevens |
| 2012/0306370 | A1 | 12/2012 | Van de Ven et al. |
| 2013/0016978 | A1 | 1/2013 | Son et al. |
| 2013/0063042 | A1 | 3/2013 | Bora et al. |
| 2013/0088522 | A1 | 4/2013 | Gettemy et al. |
| 2013/0134445 | A1 | 5/2013 | Tarsa et al. |
| 2013/0194811 | A1 | 8/2013 | Benitez et al. |
| 2013/0201690 | A1 | 8/2013 | Vissenberg et al. |
| 2013/0257314 | A1 | 10/2013 | Alvord et al. |
| 2013/0293147 | A1 | 11/2013 | Rogers et al. |
| 2013/0294086 | A1 | 11/2013 | Mayer et al. |
| 2013/0329415 | A1 | 12/2013 | Lin |
| 2014/0028377 | A1 | 1/2014 | Rosik et al. |
| 2014/0133143 | A1 | 5/2014 | Ebner |
| 2015/0022110 | A1 | 1/2015 | Sisto |
| 2015/0377695 | A1 | 12/2015 | Chang et al. |

FOREIGN PATENT DOCUMENTS

| | | | |
|---|---|---|---|
| CN | 1573881 | A | 2/2005 |
| CN | 1650673 | A | 8/2005 |
| CN | 1849707 | A | 10/2006 |
| CN | 101083866 | A | 12/2007 |
| CN | 101150904 | A | 3/2008 |
| CN | 101331798 | A | 12/2008 |
| CN | 101458067 | A | 6/2009 |
| EP | 0196347 | A1 | 10/1986 |
| EP | 0456462 | A2 | 11/1991 |
| EP | 2273851 | A2 | 1/2011 |
| GB | 2307577 | A | 5/1997 |
| JP | 06-302384 | A | 10/1994 |
| JP | 11-25822 | A | 1/1999 |
| JP | 2001514432 | A | 9/2001 |
| JP | 2004325643 | A | 11/2004 |
| JP | 2005539247 | A | 12/2005 |
| JP | 2006260927 | A | 9/2006 |
| JP | 2006302384 | A | 11/2006 |
| JP | 2007266974 | A | 10/2007 |
| JP | 2007267037 | A | 10/2007 |
| JP | 2008507150 | A | 3/2008 |
| JP | 2008201472 | A | 9/2008 |
| JP | 2008300152 | A | 12/2008 |
| JP | 2009134877 | A | 6/2009 |
| JP | 2011025822 | A | 2/2011 |
| WO | 0037904 | A1 | 6/2000 |
| WO | 03075617 | A1 | 9/2003 |
| WO | 2005024898 | A2 | 3/2005 |
| WO | 2007069149 | A1 | 6/2007 |
| WO | 2008065607 | A2 | 6/2008 |
| WO | 2008129453 | A1 | 10/2008 |
| WO | 2010124315 | A1 | 11/2010 |
| WO | 2012005771 | A2 | 1/2012 |
| WO | 2012042429 | A2 | 4/2012 |
| WO | 2013052762 | A1 | 4/2013 |
| WO | 2013142437 | A1 | 9/2013 |
| WO | 2016162331 | A1 | 10/2016 |

OTHER PUBLICATIONS

"Final Office Action mailed Jan. 28, 2015, for U.S. Appl. No. 12/806,117", 23 pages.
"Final Office Action mailed Jul. 9, 2013, for U.S. Appl. No. 12/806,118", 30 pages.
"Final Office Action mailed Jun. 14, 2013, for U.S. Appl. No. 12/806,117", 23 pages.
"Final Office Action mailed Jun. 18, 2014, for U.S. Appl. No. 13/231,077", 47 pages.
"Final Office Action mailed Nov. 28, 2011, for U.S. Appl. No. 12/360,467", 17 pages.
"Final Office Action Mailed Oct. 11, 2012, for U.S. Appl. No. 12/806,121", 24 pages.
"Final Office Action Mailed Sep. 12, 2012, for U.S. Appl. No. 12/584,143", 16 pages.
"International Search Report & Written Opinion for PCT/US2010/000219 mailed Oct. 12, 2010".
"International Search Report & Written Opinion for PCT/US2012/052774 mailed Feb. 4, 2013".
"International Search Report & Written Opinion mailed Sep. 19, 2012, for PCT/US2012/045392".
"International Search Report & Written Opinion, PCT/US2010/001919, mailed Feb. 24, 2011".
"International Search Report & Written Opinion, PCT/US2010/002171, mailed Nov. 24, 2010".
"International Search Report & Written Opinion, PCT/US2010/004953, mailed Mar. 22, 2010".
"International Search Report & Written Opinion, PCT/US2013/027157, May 16, 2013".
"Notice of Allowance mailed Aug. 21, 2014, for U.S. Appl. No. 12/584,143", 5 pages.
"Notice of Allowance mailed Feb. 21, 2014, for U.S. Appl. No. 12/806,118", 9 pages.
"Notice of Allowance mailed Feb. 25, 2013, for U.S. Appl. No. 12/806,121", 11 pages.
"Notice of Allowance mailed Feb. 4, 2013, for U.S. Appl. No. 12/806,113", 9 pages.
"Notice of Allowance mailed Jan. 20, 2012, for U.S. Appl. No. 12/360,467", 5 pages.
"Notice of Allowance mailed Jan. 28, 2014, for U.S. Appl. No. 13/178,686", 10 pages.
"Notice of Allowance mailed May 3, 2013, for U.S. Appl. No. 12/806,126", 6 pages.
"Notice of Allowance mailed Oct. 15, 2012, for U.S. Appl. No. 12/806,113", 8 pages.
"Notice of Allowance mailed Oct. 31, 2013, for U.S. Appl. No. 12/924,628", 10 pages.
Office Action mailed Apr. 22, 2014, for U.S. Appl. No. 12/806,114, 16 pages.
"Office Action Mailed Aug. 2, 2012, for U.S. Appl. No. 12/806,114", 14 pages.
"Office Action mailed Dec. 17, 2012, for U.S. Appl. No. 12/806,118", 29 pages.
"Office Action mailed Dec. 4, 2013, for U.S. Appl. No. 12/803,805", 19 pages.
"Office Action Mailed Feb. 1, 2012, for U.S. Appl. No. 12/584,143", 12 pages.
"Office Action mailed Feb. 17, 2015, for JP Application 2012-520587".
"Office Action mailed Feb. 2, 2015, for CN Application 201080035731.X".
"Office Action mailed Jul. 1, 2014, for JP Application 2012-520587".
"Office Action mailed Jul. 10, 2012, for U.S. Appl. No. 12/806,113", 11 pages.
"Office Action Mailed Jul. 11, 2012, for U.S. Appl. No. 12/806,121", 23 pages.
"Office Action mailed Jun. 10, 2013, for U.S. Appl. No. 12/924,628", 9 pages.
"Office Action mailed Jun. 23, 2014, for U.S. Appl. No. 12/806,117".
"Office Action mailed Jun. 27, 2013, for U.S. Appl. No. 13/178,686".
"Office Action mailed Mar. 6, 2015, for U.S. Appl. No. 13/773,322", 30 pages.
"Office Action mailed May 12, 2011, for U.S. Appl. No. 12/360,467", 19 pages.
"Office Action mailed Nov. 4, 2013, for CN Application No. 201080032373.7".
"Office Action mailed Nov. 12, 2013, for U.S. Appl. No. 13/231,077", 31 pages.
"Office Action Mailed Oct. 2, 2012, for U.S. Appl. No. 12/806,117", 22 pages.
"Office Action mailed Oct. 24, 2013, for U.S. Appl. No. 12/806,117", 19 pages.
"Office Action mailed Oct. 9, 2012, for U.S. Appl. No. 12/806,126", 6 pages.
"Office Action mailed Sep. 10, 2014, for U.S. Appl. No. 12/803,805", 28 pages.

(56) References Cited

OTHER PUBLICATIONS

"Partial International Search Report mailed Nov. 16, 2012, for PCT/US2012/052774".
Chonko, "Use Forward Voltage Drop to measure Junction Temperature", 2013, Penton Media, Inc., 5 pages.
Hall, et al., "Jet Engine Control using Ethernet with a Brain (Post print)", AIAA/ASME/SAE/ASEE, Joint Propulsion Conference and Exhibition, Jul. 2008, pp. 1-18.
Johnson, "Visible Light Communication: Tutorial", Project IEEE P802.15 Working Group for Wireless personal Area Networks (WPANs), Mar. 2008.
Johnson, "Visible Light Communications", CTC Tech Brief, Nov. 2009, 2 pages.
Kebemou, "A Partitioning-Centric Approach for the Modeling and the Methodical Design of Automotive Embedded System Architectures", Dissertation of Technical University of Berlin, 2008, 176 pages.
O'Brien, et al., "Visible Light Communications and Other Developments in Optical Wireless", Wireless World Research Forum, 2006, 26 pages.
Zalewski, et al. "Safety Issues in Avionics and Automotive Databuses", IFAC World Congress, Jul. 2005, 6 pages.
Office Action for U.S. Appl. No. 14/510,283 mailed Jul. 29, 2015.
Office Action mailed Mar. 11, 2014 for JP Application 2012-523605.
Office Action mailed Sep. 24, 2014 for JP Application 2012-523605.
Office Action mailed Mar. 25, 2015 for U.S. Appl. No. 14/305,472.
Notice of Allowance mailed Mar. 30, 2015 for U.S. Appl. No. 14/097,355.
Office Action mailed Apr. 8, 2015 for U.S. Appl. No. 14/305,456.
Notice of Allowance mailed May 22, 2015 for U.S. Appl. No. 14/510,212.
Office Action mailed May 27, 2015 for U.S. Appl. 12/806,117.
Partial International Search Report mailed Mar. 27, 2015 for PCT/US2014/068556.
"LED Fundamentals, How to Read a Datasheet (Part 2 of 2) Characteristic Curves, Dimensions and Packaging," Aug. 19, 2011, OSRAM Opto Semiconductors, 17 pages.
International Search Report & Written Opinion for PCT/US2014/068556 mailed Jun. 22, 2015.
Final Office Action for U.S. Appl. No. 12/803,805 mailed Jun. 23, 2015.
Office Action for U.S. Appl. No. 13/970,964 mailed Jun. 29, 2015.
Office Action for U.S. Appl. No. 14/510,243 mailed Jul. 28, 2015.
Office Action for U.S. Appl. No. 14/510,266 mailed Jul. 31, 2015.
Office Action for U.S. Appl. No. 13/970,990 mailed Aug. 20, 2015.
Partial International Search Report for PCT/US2015/037660 mailed Aug. 21, 2015.
Final Office Action for U.S. Appl. No. 13/773,322 mailed Sep. 2, 2015.
Notice of Allowance for U.S. Appl. No. 13/970,944 mailed Sep. 11, 2015.
Notice of Allowance for U.S. Appl. No. 14/604,886 mailed Sep. 25, 2015.
Notice of Allowance for U.S. Appl. No. 14/604,881 mailed Oct. 9, 2015.
International Search Report & Written Opinion for PCT/US2015/037660 mailed Oct. 28, 2015.
Office Action for U.S. Appl. No. 14/573,207 mailed Nov. 4, 2015.
Notice of Allowance for U.S. Appl. No. 14/510,243 mailed Nov. 6, 2015.
Bouchet et al., "Visible light communication system enabling 73 Mb/s data streaming," IEEE Globecom Workshop on Optical Wireless Communications, 2010, pp. 1042-1046.
Notice of Allowance for U.S. Appl. No. 12/806,117 mailed Nov. 18, 2015.
Partial International Search Report for PCT/US2015/045252 mailed Nov. 18, 2015.
International Application No. PCT/US2019/066992 filed Dec. 17, 2019 by Lutron Ketra LLC, entitled Light Source Having Multiple Differently-Colored Emitters.

* cited by examiner

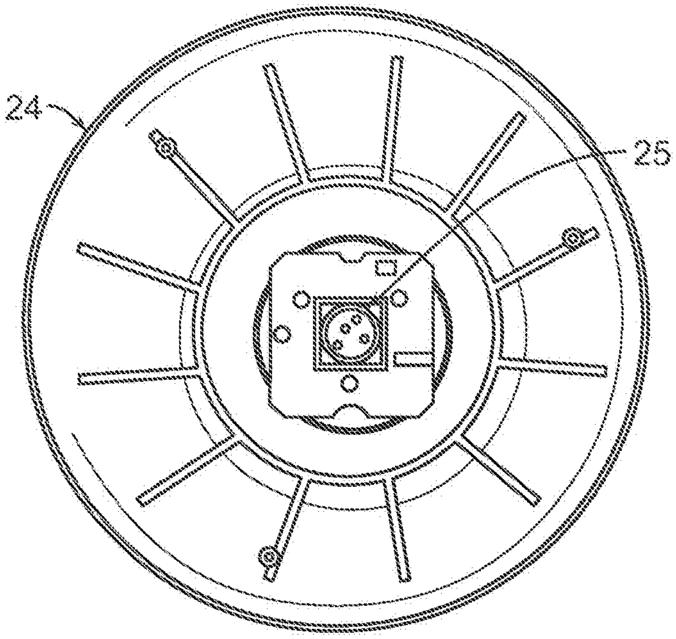
FIG. 5
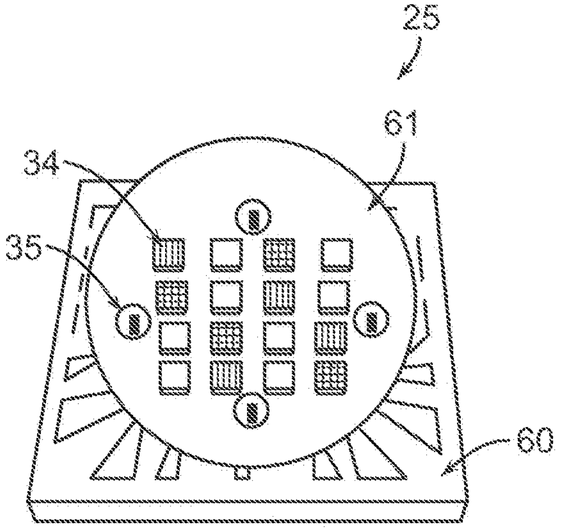
FIG. 6
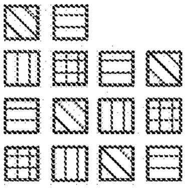

COLOR MIXING OPTICS FOR LED ILLUMINATION DEVICE

PRIORITY CLAIM

This application is a continuation of U.S. application Ser. No. 18/811,914, filed Aug. 22, 2024; which is a continuation of U.S. application Ser. No. 18/301,578, filed Apr. 17, 2023, now U.S. Pat. No. 12,072,091 issued Aug. 27, 2024; which is a continuation of U.S. application Ser. No. 17/739,857, filed May 9, 2022, now U.S. Pat. No. 11,662,077 issued May 30, 2023; which is a continuation of U.S. application Ser. No. 17/013,214, filed on Sep. 4, 2020, now U.S. Pat. No. 11,326,761, issued May 10, 2022; which is a continuation of U.S. application Ser. No. 16/422,927, filed May 24, 2019, now U.S. Pat. No. 10,767,835, issued Sep. 8, 2020; which is a continuation of U.S. application Ser. No. 15/653,608, filed Jul. 19, 2017, now U.S. Pat. No. 10,302,276, issued May 28, 2019; which claims priority to and is a divisional of U.S. application Ser. No. 14/505,671, filed Oct. 3, 2014, now U.S. Pat. No. 9,736,895, issued Aug. 15, 2017; which claims priority to U.S. Provisional Application No. 61/886,471, filed Oct. 3, 2013. Each of these applications are incorporated by reference herein in their entirety.

RELATED APPLICATIONS

This application is related to the following applications: U.S. application Ser. No. 12/803,805, which was issued as U.S. Pat. No. 9,509,525; Ser. No. 12/806,118, which was issued as U.S. Pat. No. 8,773,336; Ser. No. 13/970,944, which was issued as U.S. Pat. No. 9,237,620; Ser. No. 13/970,964, which was issued as U.S. Pat. No. 9,651,632; Ser. No. 13/970,990, which was issued as U.S. Pat. No. 9,578,724; Ser. No. 14/314,530, which was issued as U.S. Pat. No. 9,769,899; Ser. No. 14/314,580, which was issued as U.S. Pat. No. 9,392,663; and Ser. No. 14/471,081, which was issued as U.S. Pat. No. 9,510,416—each of which is hereby incorporated by reference in its entirety.

BACKGROUND

1. Field of the Invention

The invention relates to the addition of color mixing optics and optical feedback to produce uniform color throughout the light beam produced by a multi-color LED illumination device.

2. Description of Related Art

Multi-color LED illumination devices (also referred to herein as light sources, luminaires or lamps) have been commercially available for many years. For example, Cree has marketed a variety of primarily indoor downlights, troffers, and other form factor luminaires that combine white and red LEDs to provide higher color rendering index (CRI) and efficacy than conventional white LEDs alone can provide.

Philips Color Kinetics has marketed many multi-color LED products; however, most are restricted to indoor and outdoor saturated wall-washing color and color changing effects. Recently, Philips introduced the "Hue" product, which has an A19 form factor that provides colored, as well as white light. This product combines blue, red, and phosphor converted LEDs to produce saturated blue and red light, pastel green, and white light that can be controlled by a computer or smartphone. The phosphor converted LEDs produce a greenish light, but cannot produce a saturated green, like that of a red/green/blue/white (RGBW) LED combination. Since the Hue product has an A19 form factor, color mixing is achieved with simple diffusers arranged in the output light path above the LED package. Color accuracy in the Hue product is susceptible to LED aging, since it does not use optical feedback to compensate for the change in luminance over time for each of the differently colored LEDs.

Conventional color mixing optics typically use light guides, which tend to be large and inefficient. The rule of thumb for a light guide is that it should be about 10 times longer than the dimensions of the multi-color light source. A typical 90 Watt halogen bulb produces about 1200 lumens. An array of many large LEDs is necessary to produce such output light. For instance, 1200 lumen output LED arrays from Cree are about 5-6 mm in diameter. If such a light source comprised multi-colored LEDs, a 50-60 mm light guide would be needed to properly mix the colors. Considering that the light beam needs to be shaped after color mixing, the dimensions needed for a light guide become prohibitive.

No products currently exist on the market that provide both accurate white light along the black body curve and saturated colors. Further, no such products exist in a PAR form factor that provide uniform color throughout the standard 10, 25, and 40 degree beam angles. As such, a need exists for improved techniques to produce full color gamut LED light sources that do not change over time and that have uniform color throughout the entire light beam.

SUMMARY OF THE INVENTION

Illumination devices with improved color mixing optics and methods are disclosed herein for mixing the colors produced by a multi-colored LED emitter module to produce uniform color throughout the entire beam angle of the output light beam. Embodiments disclosed herein include a unique arrangement of multi-color LEDs in an emitter module, a unique exit lens with different patterns of lenslets formed on opposing sides of the lens, and other associated optical features that thoroughly mix the different color components, and as such, provide uniform color across the output beam exiting the illumination device. Additional embodiments disclosed herein include an arrangement of photodetectors within the primary optics structure of the LED emitter module that ensure the optical feedback system properly measures the light produced by all emission LEDs. As described herein, various embodiments may be utilized, and a variety of features and variations can be implemented as desired, and related systems and methods can be utilized as well. Although the various embodiments disclosed herein are described as being implemented in a PAR38 lamp, certain features of the disclosed embodiments may be utilized in illumination devices having other form factors to improve the color mixing in those devices.

According to one embodiment, an emitter module of an illumination device may include a plurality of emission LEDs that are mounted onto a substrate and encapsulated within a primary optics structure. In a preferred embodiment, the plurality of emission LEDs are electrically coupled as N chains of serially connected LEDs with N LEDs in each chain, and each chain may be configured to produce a different color of light. In some embodiments, the colors of LEDs included within the multi-color emitter module may be selected to provide a wide output color gamut and a range of precise white color temperatures along the black body curve. For example, chains of red, green, and blue (RGB) LEDs can be used to provide saturated colors, and the light from such RGB chains can be combined with a chain of phosphor converted white LEDs to provide a wide range of white and pastel colors. In one embodiment, each of the four RGBW LED chains may comprise four LEDs to provide sufficient lumen output, efficacy, and color mixing; however, the invention can be applied to various numbers of LED chains, combinations of LED colors, and numbers of LEDs per chain without departing from the scope of the invention. As described in more detail below, the illumination device improves color mixing, at least in part, by arranging the multi-color emission LEDs in a unique pattern.

According to one embodiment, the plurality of emission LEDs may be arranged in an array of N×N LEDs, where N is the number of LED chains and the number of LEDs included within each chain. In order to improve color mixing, the serially connected LEDs within each chain may be spatially scattered throughout the array, such that no two LEDs of the same color are arranged in the same row, column or diagonal. In the above example of four chains of four LEDs per chain (e.g., four red LEDs, four green LEDs, four blue LEDs and four white LEDs), the different colored LEDs are arranged in a four by four square, such that no two LEDs of the same color exist in the same row, column, or diagonal. It is generally desired that the LEDs be placed together as tightly as possible, and that the LED colors with the biggest difference in spectrum (e.g., red and blue) be grouped closer together.

It is worth noting that the inventive features described herein are not limited to a multi-colored LED emitter module having four chains of four LEDs per chain, and may be applied to a multi-colored LED emitter module including substantially any number of chains with substantially any number of LEDs per chain. For example, one alternative configuration may include four red, four blue, and eight phosphor converted LEDs for an application with higher lumen output, but smaller color gamut. In such a configuration, the additional four phosphor converted LEDs may replace the four green LEDs. Another alternative configuration may include chains of four red, four blue, four green and four yellow LEDs. Yet another alternative configuration may include chains of three red, three blue and three green LEDs. The number of LED chains, the number of LEDs per chain, and the combination of LED colors may be chosen to provide a desired lumen output and color gamut.

According to another embodiment, the plurality of emission LEDs within the emitter module may be spatially divided into N blocks, wherein N is an integer value greater than or equal to three (3). Each of the N blocks may consist of N LEDs, wherein each LED is configured for producing a different color of light. The N differently colored LEDs within each block are preferably arranged to form a polygon having N sides. For example, if N=3, the three differently colored LEDs (e.g., RGB) within each block are arranged to form a triangle. If N=4, the four differently colored LEDs (e.g., RGBW or RGBY) within each block are arranged to form a square.

The N blocks of LEDs may be arranged in a pattern on the substrate of the emitter module to form an outer polygon having N sides and an inner polygon having N sides. If N=3, the inner and outer polygons form triangles, and if N=4, the inner and outer polygons form squares. Within the outer polygon, the N blocks of LEDs are arranged on the substrate, such that: one LED within each block is located on a different vertex of the inner polygon, and the remaining LEDs within each block are located along the N sides of the outer polygon. To improve color mixing within the emitter module, the N blocks of LEDs are arranged, such that the LEDs located on the vertices of the inner polygon are each configured to produce a different color of light, and the LEDs located along each side of the outer polygon are also each configured to produce a different color of light. Such a configuration spatially scatters the differently colored LEDs across the substrate to improving color mixing within the illumination device.

According to another embodiment, the plurality of emission LEDs are mounted onto a ceramic substrate, such as aluminum nitride or aluminum oxide (or some other reflective surface), and encapsulated within a primary optics structure. As noted above, the plurality of emission LEDs may be arranged in a pattern on the substrate so as to form an outer polygon having N sides, where N is an integer value greater than or equal to 3. In one embodiment, the primary optics structure encapsulating the emission LEDs may be a silicone hemispherical dome, wherein the diameter of the dome is substantially larger (e.g., about 1.5 to 4 times larger) than the diameter of the LED array to prevent occurrences of total internal reflection. The dome may be generally configured to transmit a majority of the illumination emitted by the emission LEDs. In some embodiments, the dome may be textured with a slightly diffused surface to increase light scattering and promote color mixing, as well as to provide a slight increase (e.g., about 5%) in reflected light back toward photodetectors, which are also mounted on the substrate of the emitter module and encapsulated within the dome.

According to another embodiment, a plurality of photodetectors may be mounted on the substrate (e.g., a ceramic substrate) and encapsulated within the primary optics structure (e.g., within the hemispherical dome). The photodetectors may be silicon diodes, although LEDs configured in a reverse bias may be preferred. According to one embodiment, a total of N photodetectors may be mounted on the substrate and arranged around a periphery of the outer polygon having N sides, such that the N photodetectors are placed near a center of the N sides of the outer polygon. In one example, four photodetectors (detector LEDs or silicon diodes) may be mounted on the substrate, one per side, in the middle of the side, and as close as possible to the square N×N array of emission LEDs. In another example, three photodetectors (detector LEDs or silicon photodiodes) may be mounted on the substrate, one per side, near the middle and as close as possible to each side of the triangular pattern of 3 blocks of 3 differently colored LEDs.

In addition to having a desired arrangement on the substrate, the plurality of photodetectors are preferably connected in parallel to receiver circuitry of the illumination device for detecting a portion of the illumination that is emitted by the emission LEDs and/or reflected by the dome. In general, the receiver circuitry typically may comprise a trans-impedance amplifier that detects the amount of light produced by each emission LED chain individually. Various other patents and patent applications assigned to the assignee, including U.S. Publication No. 2010/0327764, describe means to periodically turn all but one emission LED chain off so that the light produced by each chain can be individually measured. This invention describes the placement and connection between the photodetectors to ensure that the light for all similarly colored emission LEDs, which are scattered across the substrate, is properly detected.

Any photodetector in a multi-color illumination device with optical feedback should be placed to minimize interference from external light sources. This invention places the photodetectors within the primary optics structure (e.g., the silicone dome) for this purpose. The four photodetectors are connected in parallel to sum the photocurrent produced by each photodetector, which minimizes any spatial variation in photocurrents caused by scattering the similarly colored emission LEDs across the substrate. According to one embodiment, the photodetectors are preferably red or yellow LEDs, but could comprise silicon diodes or any other type of light detector. The red or yellow detector LEDs are preferable since silicon diodes are sensitive to infrared as well as visible light, while the LEDs are sensitive to only visible light.

LED or silicon photodetectors produce current that is proportional to incident light. Such current sources easily sum when the photodetectors are connected in parallel. When connected in parallel, the N photodetectors function as one larger detector, but with much better spatial uniformity. For instance, with only one photodetector, light from one LED in a given chain may produce much more photocurrent than light from another LED in the same chain. As the emission LEDs age and the light output decreases, the optical feedback algorithm compensates for changes in the emission LED that induces the largest photocurrent simply due to LED and detector placement. N photodetectors connected in parallel resolves this issue.

In addition to the unique pattern in which the multi-colored LED chains are scattered about the emitter array, the advantageous placement of parallel coupled LED photodetectors within the primary optics structure, and the optionally diffused dome, additional embodiments disclosed herein provide unique secondary optics to provide further color mixing and beam shaping for the illumination device. According to one embodiment, such secondary optics may include an exit lens with substantially different arrays of lenslets formed on opposing sides of the lens, and a parabolic reflector having a plurality of planar facets (or lunes) that produce uniform color in the light beam exiting the illumination device and partially shape the light beam.

According to one example, a unique exit lens structure may comprise a double-sided pillow lens having an array of lenslets formed on each side of the lens, wherein the array of lenslets formed on an interior side of the exit lens is configured with an identical aperture shape, but different dimensions (e.g., size, curvature, etc.) than the array of lenslets formed on an exterior side of the exit lens. Such an exit lens breaks up the light rays from each individual emission LED and effectively randomizes the light rays to promote color mixing. The lunes in the parabolic reflector provide further randomization and color mixing, as well as beam shaping.

In some embodiments, the identical aperture shape of the lenslets formed on the interior and exterior sides of the exit lens may be a polygon having N sides, wherein N is an even number greater than or equal to four (4) (e.g., a square, hexagon, octagon, etc.). A polygon with an even number of straight sides is desirable, in some embodiments, since it provides a repeatable pattern of lenslets. However, the aperture shape is not limited to a polygon, and may be substantially circular in other embodiments.

The exit lens is preferably designed such that the lenslets formed on the interior side are substantially larger than the lenslets formed on the exterior side of the exit lens. As light rays from the emitter module enter the exit lens, the larger lenslets on the interior side of the lens function to slightly redirect the light rays through the interior of the exit lens, while the smaller lenslets on the exterior side of the exit lens focus the light rays differently, depending on the location of the individual smaller lenslets relative to the larger lenslets. The resulting output light beam has uniform color across the entire beam angle and softer edges than can be provided by a conventional exit lens, such as a single-sided pillow lens, wherein lenslets are provided on only one side of the lens, while a planar surface or Fresnel lens is provided on the other side.

In one example, the internal side of the exit lens may include a pattern of hexagonal lenslets that are, for example, three times larger than the diameter of the hexagonal lenslets included on the exterior side of the lens. In this example, an aperture ratio of the hexagonal lenslets formed on the interior side to the hexagonal lenslets formed on the exterior side may be 3:1. In another example, square or circular lenslets may be used on the interior and exterior sides of the exit lens. When square lenslets are used, the aperture ratio of the lenslets formed on the interior side to those on the exterior side may be 4:1. When circular lenslets are used, the aperture ratio of the lenslets formed on the interior side to those on the exterior side may be 3:1 or 4:1. Other aperture ratios may be used as desired.

In addition to aperture shape and size, the curvature of the lenslets, the alignment of the lenslet arrays and the material of the exit lens may be configured to provide a desired beam shaping effect. In some embodiments, the arrays of lenslets formed on the interior and exterior sides of the exit lens may be aligned, such that a center of each larger lenslet formed on the exterior side is aligned with a center of one of the smaller lenslets formed on the interior side of the exit lens. Aligning the lenslet arrays in such a manner significantly improves center beam intensity, which is important for focused light applications. In some embodiments, the curvature of the lenslets (defined by the radius of the arcs that create the lenslets) may also be chosen to shape the beam and improve center beam intensity. In one example, a curvature ratio of the lenslets formed on the interior side to those formed on the exterior side may be within a range of about 1:10 to about 1:9. It is noted, however, that the curvature ratio and the aperture ratios mentioned are exemplary and generally valid when the exit lens is formed from a material having a refractive index within a range of about 1.45 to about 1.65. Other curvature ratios and aperture ratios may be appropriate when using materials with a substantially different refractive index.

DESCRIPTION OF THE DRAWINGS

Other objects and advantages of the invention will become apparent upon reading the following detailed description and upon reference to the accompanying drawings.

FIG. 5 is a picture of the exemplary heat sink and emitter module for the exemplary illumination device.

FIG. 6 is a close up view of the exemplary emitter module.

Figure 1:
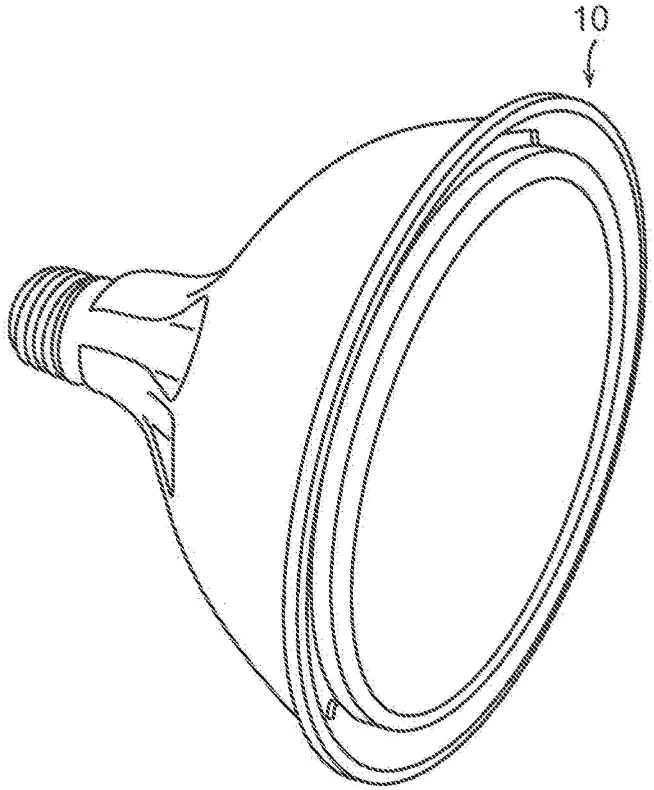
FIG. 1 is a picture of an exemplary illumination device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings, FIG. 1 is a picture of an example illumination device 10, which according to one embodiment, is an LED lamp with a PAR38 form factor. As described in more detail below, LED lamp 10 produces light over a wide color gamut, thoroughly mixes the color components within the beam, and uses an optical feedback system to maintain precise color over LED lifetime. LED lamp 10 is preferably powered by the AC mains and screws into any standard PAR38 fixture. The light beam produced by LED lamp 10 is substantially the same as the light beam produced by halogen PAR38 lamps with any beam angle, but typically between 10 and 40 degrees.

LED lamp 10 is just one example of a wide color gamut illumination device that is configured to provide uniform color within the beam and precise color control over LED lifetime. In addition to a PAR38 form factor, the inventive concepts described herein could be implemented in other standard downlight form factors, such as PAR20 or PAR30, or MR 8 or 16. Additionally, the inventive concepts could be implemented in luminaires with non-standard form factors, such as outdoor spot lights using light engines. As such, FIG. 1 is just one example implementation of an illumination device according to the invention.

Figure 2:
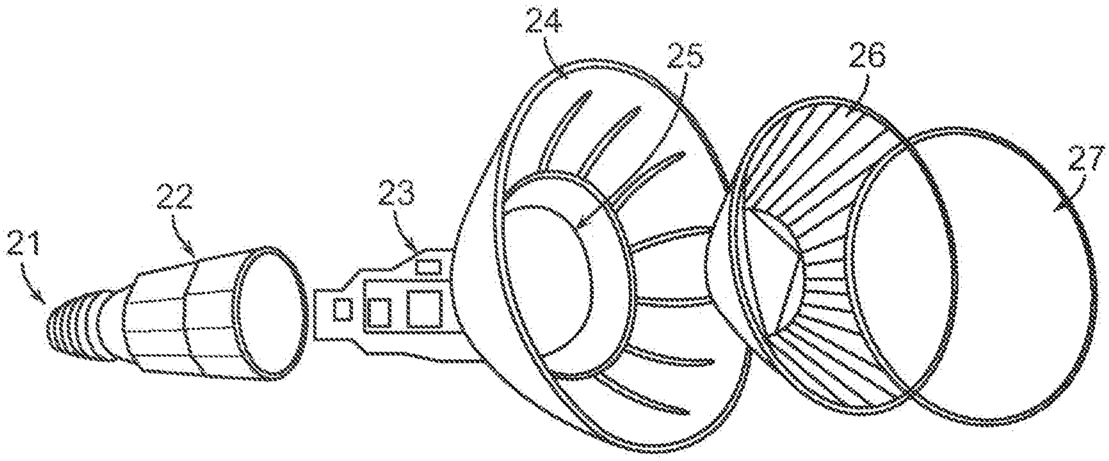
FIG. 2 is a picture of various components included within the exemplary illumination device.

FIG. 2 is a picture of possible components included within example LED lamp 10 comprising Edison base 21, driver housing 22, driver board 23, heat sink 24, emitter module 25, reflector 26, and exit lens 27. In the illustrated embodiment, Edison base 21 connects to the AC mains through a standard connection and provides power to driver board 23, which resides inside driver housing 22 when assembled. Driver board 23 converts AC power to well controlled DC currents for controlling the emission LEDs (shown in FIGS. 3 and 6-9) included within emitter module 25. Driver board 23 and emitter module 25 are thermally connected to heat sink 24. Driver board 23 also connects to the photodetectors (shown in FIGS. 3 and 6-9) on emitter module 25.

Light produced by the emission LEDs within emitter module 25 is shaped into an output beam by parabolic reflector 26. The planar facets or lunes included within reflector 26 (shown in FIG. 10) provide some randomization of light rays from emitter module 25 prior to exiting LED lamp 10 through exit lens 27. Exit lens 27 comprises an array of lenslets formed on both sides of the exit lens. As described in more detail below, the lenslets formed on the interior side of the exit lens are preferably configured with an identical aperture shape, but different dimensions, than the lenslets formed on the exterior side of the exit lens. In some embodiments, each side of the exit lens 27 may include an array of hexagonally, square or circular shaped lenslets. However, the lenslets included on one side of the exit lens may be substantially larger than the lenslets included on the other side of the exit lens. Providing an exit lens 27 with different sized, yet identically shaped lenslets randomizes the light rays from emitter module 25, while the reflector 26 further randomizes the light rays and also shapes the beam exiting LED lamp 10.

FIG. 2 illustrates just one possible set of components for LED lamp 10. If LED lamp 10 conformed to standard form factors, other than PAR38, the mechanics and optics could be significantly different than shown in FIG. 2. Likewise, the components would also be different for luminaires using light engines or other light sources. As such, FIG. 2 is just one example.

Figure 3:
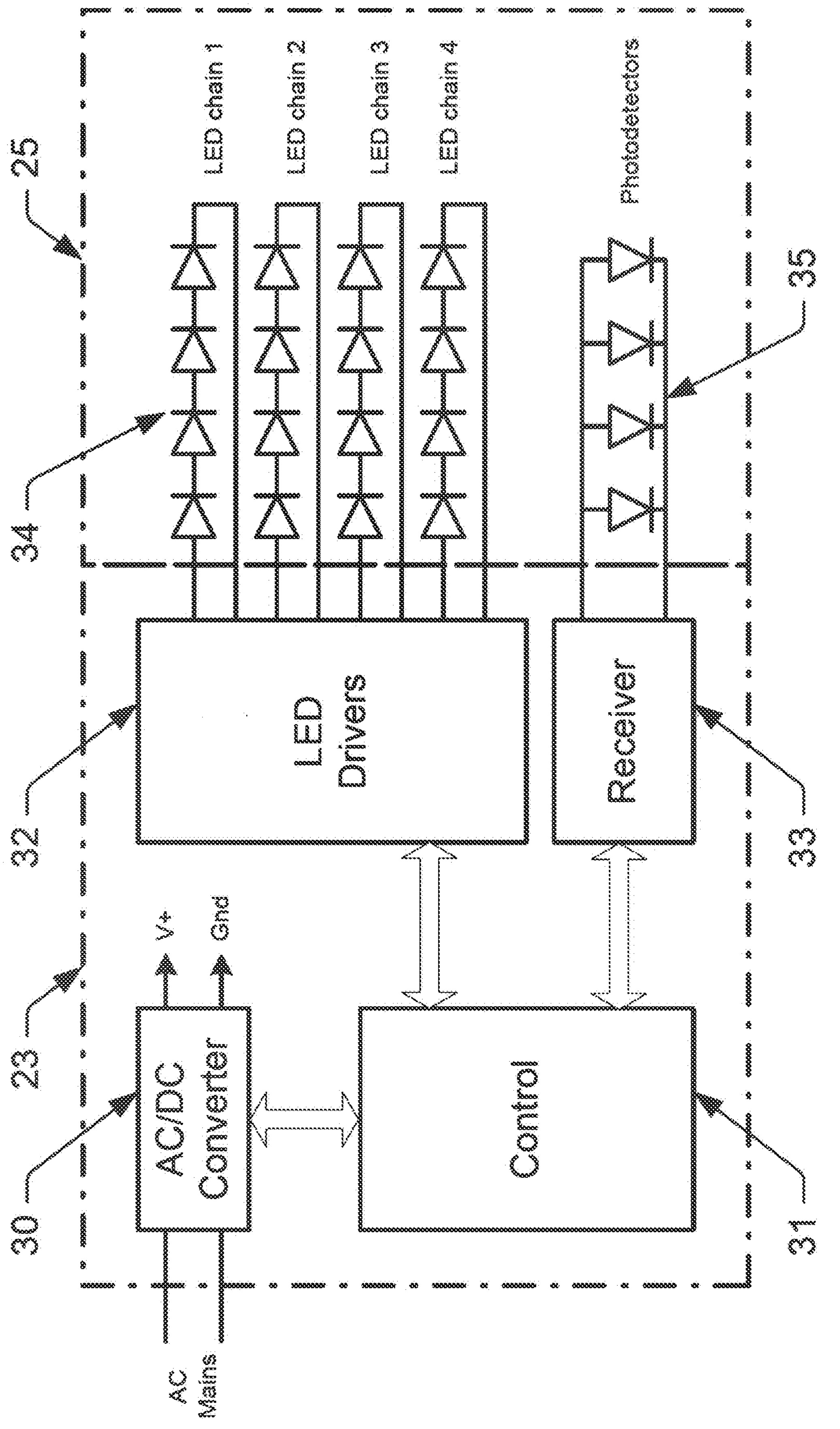
FIG. 3 is an exemplary block diagram of circuitry included within the driver board and LED emitter module of the exemplary illumination device.

FIG. 3 is an exemplary block diagram for the circuitry, which may be included on driver board 23 and emitter module 25, according to one embodiment. In the illustrated embodiment, driver board 23 comprises AC/DC converter 30, control circuit 31, LED drivers 32, and receiver 33. AC/DC converter 30 functions to converter the AC mains voltage (e.g., 120V or 240V) to a DC voltage (e.g., typically 15-20V), which is used in some embodiments to power control circuit 31, LED drivers 32, and receiver 33. In some embodiments, a DC/DC converter (not shown in FIG. 3) may be included on the driver board 23 to further regulate the DC voltage from AC/DC converter 30 to lower voltages (e.g., 3.3V), which may be used to power low voltage circuitry included within the illumination device, such as a PLL (not shown), a wireless interface (not shown) and/or the control circuit 31. LED drivers 32 are connected to emission LEDs 34 and receiver 33 is connected to photodetectors 35. In some embodiments, LED drivers 32 may comprise step down DC to DC converters that provide substantially constant current to the emission LEDs 34.

Emission LEDs 34, in this example, comprise four differently colored chains of LEDs, each having four LEDs per chain. In one example, emission LEDs 34 may include a chain of four red LEDs, a chain of four green LEDs, a chain of four blue LEDs, a chain of four white LEDs. In another example, a chain of four yellow LEDs may be used in place of the chain of four white LEDs. In yet another example, an additional chain of white LEDs may be used in place of the chain of green LEDs. Although four chains of four LEDs per chain are shown in FIG. 3, the emission LEDs 34 are not restricted to the illustrated embodiment and may comprise substantially any number of chains with substantially any number of LEDs per chain. In addition, the emission LEDs 34 are not restricted to only the color combinations mentioned herein and may comprise substantially any combination of differently colored LED chains. In fact, the only restriction placed on the emission LEDs 34 is that the identically colored LEDs within each chain are serially connected, yet spatially scattered across the emitter module 25. Unique arrangements of the emission LEDs 34 are described below with respect to FIGS. 7-9.

In general, LED drivers 32 may include a number of driver blocks equal to the number of LED chains 34 included within the illumination device. In the exemplary embodiment shown in FIG. 3, LED drivers 32 comprise four driver blocks, each configured to produce illumination from a different one of the LED chains 34. Each driver block receives data indicating a desired drive current from the control circuit 31, along with a latching signal indicating when the driver block should change the drive current supplied to a respective one of the emission LED chains 34. Each driver block within LED drivers 32 typically produces and supplies a different current (level or duty cycle) to each chain to produce the desired overall color output from LED lamp 10.

In some embodiments, LED drivers 32 may comprise circuitry to measure ambient temperature, emitter and/or detector forward voltage, and/or photocurrent induced in the photodetectors by ambient light or light emitted by the emission LEDs 34. In one example, LED drivers 32 may include circuitry to measure the operating temperature of the emission LEDs 34 through mechanisms described, e.g., in U.S. application Ser. Nos. 13/970,944; 13/970,964; and Ser. No. 13/970,990. Such circuitry may be configured to periodically turn off all LED chains but one to perform forward voltage measurements on each LED chain, one chain at a time, during periodic intervals. The forward voltage measurements detected for each LED chain may then be used to adjust the drive currents supplied to each LED chain to account for changes in LED intensity caused by changes in temperature. In another example, LED drivers 32 may include circuitry for obtaining forward voltage and induced photocurrent measurements during the periodic intervals, so that the respective drive currents supplied to the LED chains can be adjusted to account for changes in LED intensity and/or chromaticity caused by changes in drive current, temperature or LED aging. Exemplary driver circuitry is described, e.g., in U.S. application Ser. Nos. 14/314,530; 14/314,580; and Ser. No. 14/471,081.

As shown in FIG. 3, a plurality of photodetectors 35 are connected in parallel to the receiver circuitry 33 of the illumination device for detecting at least a portion of the illumination emitted by the emission LEDs 34. In one example, the plurality of photodetectors 35 may comprise four small red LEDs, which are connected in parallel to receiver 33. However, the photodetectors 35 are not limited to red LEDs, and may alternatively comprise yellow or orange LEDs, silicon diodes or any other type of light detector. In some embodiments, red or yellow detector LEDs are preferable since silicon diodes are sensitive to infrared as well as visible light, while the LEDs are sensitive only to visible light.

LED or silicon photodetectors produce photocurrent that is proportional to incident light. This photocurrent easily sums when the photodetectors are connected in parallel, as shown in FIG. 3. When connected in parallel, the plurality of photodetectors 35 function as one larger detector, but with much better spatial uniformity. For example, preferred embodiments of the invention scatter or distribute the same colored LEDs within each chain across the emitter module 25 to improve color mixing. If only one photodetector were included within the emitter module 25, light from one LED in a given chain would produce much more photocurrent than light from another LED in the same chain. By distributing the photodetectors 35 around a periphery of the emission LEDs 34 and connecting the photodetectors 35 in parallel, the photocurrents produced by each of the photodetector 35 is summed to minimize any spatial variation in photocurrents caused by scattering the same colored emission LEDs across the emitter module.

Receiver 33 may comprise a trans-impedance amplifier that converts the summed photocurrent to a voltage that may be digitized by an analog-to-digital converter (ADC) and used by control circuit 31 to adjust the drive currents produced by LED drivers 32. In some embodiments, receiver 33 may further measure the temperature (or forward voltage) of photodetectors 35 through mechanisms described, e.g., in pending U.S. patent application Ser. Nos. 13/970,944, 13/970,964, 13/970,990. In some embodiments, receiver 33 may also measure the forward voltage developed across the photodetectors 35 and the photocurrent induced within the photodetectors 35 as described, e.g., in pending U.S. patent application Ser. Nos. 14/314,530, 14/314,580 and 14/471,081. The forward voltage and/or induced photocurrent measurements may be used by the control circuit 31 to adjust the drive currents produced by the LED drivers 32 to account for changes in LED intensity and/or chromaticity caused by changes in drive current, temperature or LED aging.

Control circuit 31 may comprise means to control the color and/or brightness of LED lamp 10. Control circuit 31 may also manage the interaction between AC/DC converter 30, LED drivers 32, and receiver 33 to provide the features and functions necessary for LED lamp 10. For example, control circuit 31 may be configured for determining the respective drive currents, which should be supplied to the emission LEDs 34 to achieve a desired intensity and/or a desired chromaticity for the illumination device. The control circuit 31 may also be configured for providing data to the driver blocks indicating the desired drive currents, along with a latching signal indicating when the driver blocks should change the drive currents supplied to the LED chains 34. Control circuit 31 may further comprise memory for storing calibration information, which may be used to adjust the drive currents supplied to the emission LEDs 34 to account for changes in drive current, temperature and LED aging effects. Examples of calibration information and methods, which use such calibration information to adjust LED drive currents, are disclosed in the pending U.S. patent applications mentioned herein.

FIG. 3 is just one example of many possible block diagrams for driver board 23 and emitter module 25. Driver board 23 could, for instance, be configured to drive more or less LED chains, or have multiple receiver channels. In other embodiments, driver board 23 could be powered by a DC voltage instead of an AC voltage, and as such, would not need AC/DC converter 30. Emitter module 25 could have more or less emission LEDs 34 configured in more or less chains or more or less LEDs per chain. As such, FIG. 3 is just an example.

Figure 4:
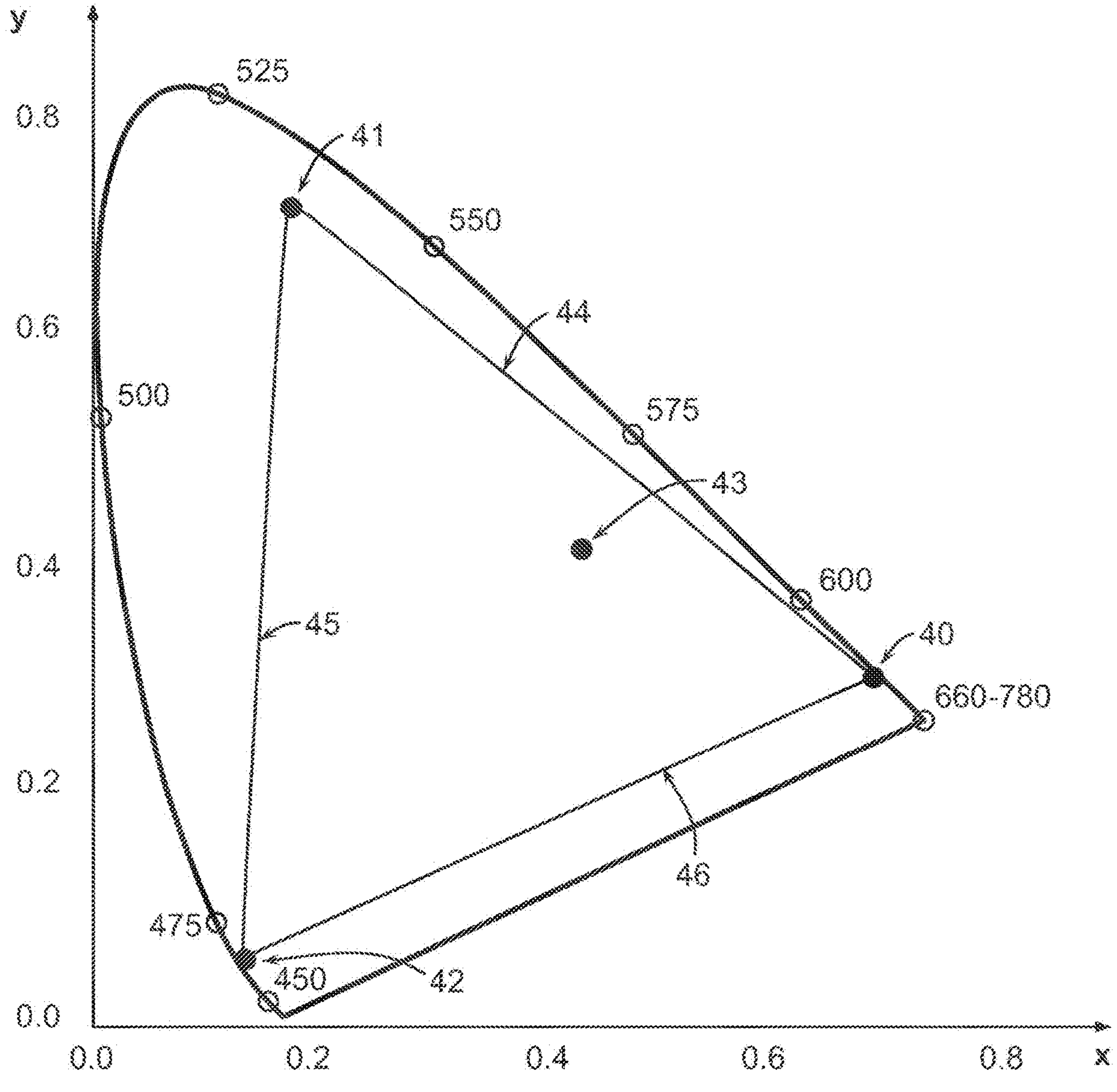
FIG. 4 is an exemplary illustration of the color gamut provided by the exemplary illumination device on a CIE1931 color chart.

FIG. 4 is an illustration of an exemplary color gamut that may be possible to produce with LED lamp 10. Points 40, 41, 42, and 43 represent the color respectively produced by exemplary red, green, blue, and white LED chains 34. The lines 44, 45, and 46 represent the boundaries of the colors that such a combination of emission LEDs could produce. All colors within the color gamut or triangle formed by lines 44, 45, and 46 can be produced.

FIG. 4 is just one example color gamut. For instance, the green LED chain within LEDs 34 could be replaced with four more phosphor converted white LEDs to produce higher lumen output over a small color gamut. Such phosphor converted white LEDs could have chromaticity in the range of (0.4, 0.5) which is commonly used in white plus red LED lamps. Alternatively, cyan or yellow LED chains could be added to expand the color gamut or used in place of the chain of white LEDs. As such FIG. 4 is just one example color gamut.

FIG. 5 illustrates an example placement of emitter module 25 within heat sink 24. FIG. 6 is a close-up picture of an exemplary embodiment of an emitter module 25 with a 4×4 array of emission LEDs 34 and four photodetector LEDs 35, each arranged as close as possible to a different side of the LED emitter array.

As shown in FIG. 6, emission LEDs 34 and photodetectors 35 are mounted on a substrate 60 and are encapsulated by a primary optics structure 61. In one embodiment, substrate 60 may comprise a laminate material such as a printed circuit board (PCB) FR4 material, or a metal clad PCB material. However, substrate 60 is preferably formed from a ceramic material (or some other optically reflective material), in at least one embodiment of the invention, so that the substrate may generally function to improve output efficiency by reflecting light back out of the emitter module 25. In some embodiments, substrate 60 may comprise an aluminum nitride or an aluminum oxide material, although different materials may be used. In some embodiments, substrate 60 may be further configured as described, e.g., in U.S. application Ser. Nos. 14/314,530 and 14/314,580.

The primary optics structure 61 may be formed from a variety of different materials and may have substantially any shape and/or dimensions necessary to shape the light emitted by the emission LEDs 34 in a desirable manner. According to one embodiment, the primary optics structure 61 is a hemispherical dome. However, one skilled in the art would understand how the primary optics structure 61 may have substantially any other shape or configuration, which encapsulates the emission LEDs 34 and the photodetectors 35 within the primary optics structure 61. In general, the shape, size and material of the dome 61 are configured to improve optical efficiency and color mixing within the emitter module 25.

In the PAR 38 form factor, the diameter of the dome 61 is preferably larger than the diameter of the array of emission LEDs 34, and may be on the order of 1.5 to 4 times larger, in some embodiments. Smaller or larger dome diameters may be used in other form factors. The dome 61 may comprise substantially any light transmissive material, such as silicone, and may be formed through an overmolding process, for example. In some embodiments, the surface of the dome 61 may be lightly textured to increase light scattering and promote color mixing, as well as to slightly increase (e.g., about 5%) the amount of light reflected back toward the detectors 35 mounted on the ceramic substrate 60.

Figure 7:
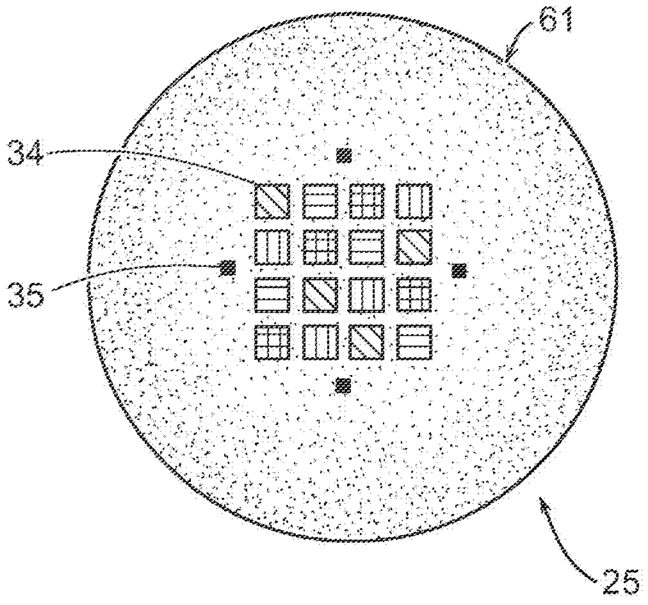
FIG. 7 is a computer drawing of the exemplary emitter module illustrating a unique arrangement of emission LEDs and photodetectors, according to one embodiment.

FIG. 7 is a computer drawing showing one embodiment of emitter module 25 comprising a 4×4 array of emission LEDs 34 and four LED photodetectors 35. In this example, the 4×4 array of emission LEDs 34 comprises a chain of four red LEDs, a chain of four green LEDs, a chain of four blue LEDs, and a chain of four white LEDs. The emission LEDs 34 in each chain are electrically coupled in series, yet spatially scattered about the array, so that no color appears twice in any row, column or diagonal. Such a color pattern is unique for a 4×4 array and improves color mixing over other arrangements of emission LEDs that do not follow such rule. Although a particular pattern of LEDs 34 is shown in FIG. 7, the distribution of the same colored LEDs in each chain across the 4×4 array can change and the pattern can be rotated or mirrored. In some embodiments, the above rule can be expanded to N×N arrays of N LED chains with N LEDs per chain, where N is any number greater than three. In some cases, more than one LED chain may be provided with the same color of LEDs, provided the number of LEDs per chain is a multiple of N. Multiple patterns exist for arrays larger than 4×4.

FIG. 7 also illustrates an example placement of photodetectors 35 relative to the 4×4 array of emission LEDs 34. In this example, the array of emission LEDs 34 forms a square, and the photodetectors 35 are placed close to, and in the middle of, each edge of the square. Photodetectors 35 may be any devices that produce current indicative of incident light. However, photodetectors 35 are preferably LEDs with peak emission wavelengths in the range of 550 nm to 700 nm, since such photodetectors will not produce photocurrent in response to infrared light, which reduces interference from ambient light. In one exemplary embodiment, photodetectors 35 may include red, orange, yellow and/or green LEDs. The LEDs used to implement photodetectors 35 are generally smaller than the emission LEDs 34, and are generally arranged to capture a maximum amount of light that is emitted from the emission LEDs 34 and/or reflected from the dome 61.

As shown in FIG. 3 and described above, the photodetectors 35 are coupled in parallel to receiver 33. By connecting the photodetectors 35 in parallel with the receiver 33, the photocurrents induced on each of the four photodetectors are summed to minimize spatial variation between the similarly colored LEDs, which are scattered about the array. In other words, the photocurrent induced on each photodetector 35 by each similarly colored emission LED 34 will vary depending on positioning of that LED. By summing the photocurrents induced on the photodetectors 35 by all four similarly colored LEDs, the spatial variation is reduced substantially. The photocurrents are then forwarded to receiver 33 and on to control circuit 31.

The above arrangement of photodetector LEDs 35 and the electrical connection in parallel allow the light output from many different arrangements of emission LEDs 34 to be accurately measured. The key to accurate measurement is that the multiple photodetectors 35 are arranged within the emitter module 25, such that the sum of the photocurrents is representative of the total light output from each LED chain. In the embodiment of FIG. 7, one photodetector is placed on each edge of the emission LED 34 array and all photodetectors 35 are connected in parallel to receiver 33. However, FIG. 7 is just one example placement of photodetectors 35 within a multicolor LED emitter module 25.

It is important to note that the arrangement of emission LEDs 34 and photodetectors 35 is not limited to only the embodiment shown in FIGS. 6-7 and described above. In some embodiments, the emission LEDs 34 and photodetectors 35 may be arranged somewhat differently on the substrate 60, depending on the number of LED chains and the number of LEDs included within each chain.

According to one embodiment, emitter module 25 may comprise a plurality of emission LEDs 34 that are electrically coupled as N chains of serially connected LEDs with N LEDs in each chain, wherein each chain is configured to produce a different color of light. Unlike the previous embodiment, in which emission LEDs 34 are arranged in an N×N array and similarly colored LEDs are distributed across the array, the emission LEDs 34 in this embodiment are spatially divided into N blocks, wherein N is an integer value greater than or equal to 3.

Figure 8:
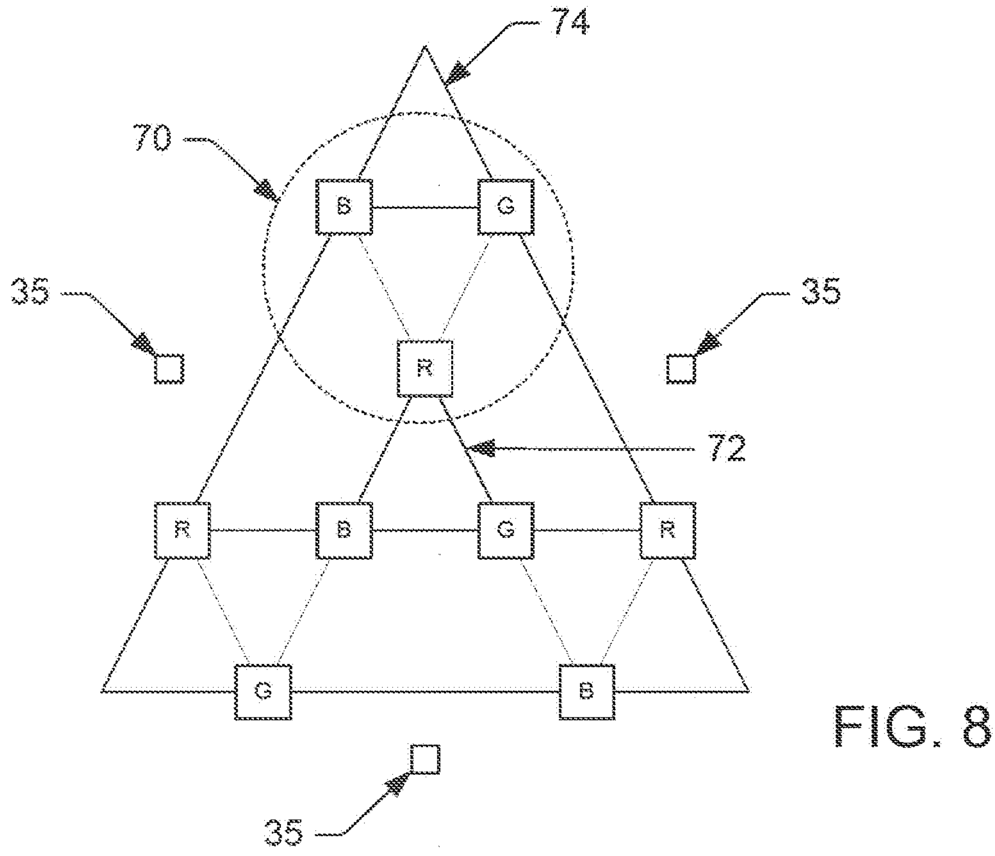
FIG. 8 is a diagram illustrating another unique arrangement of emission LEDs and photodetectors, according to another embodiment.
Figure 9:
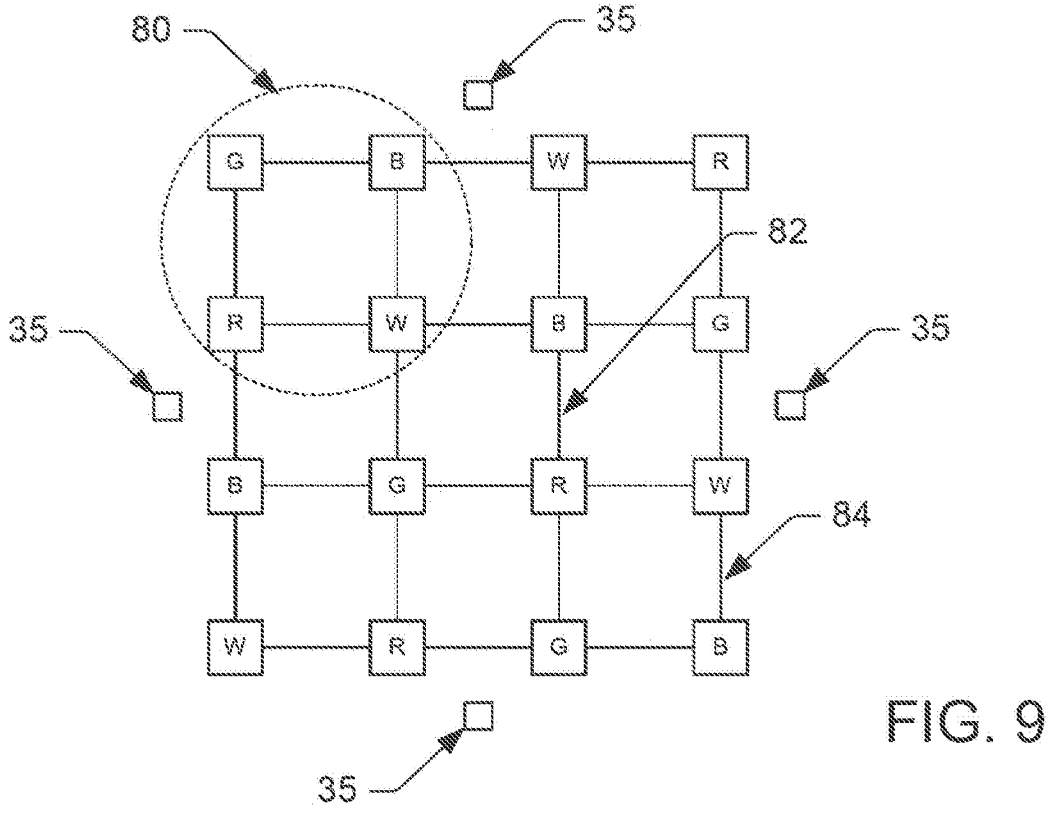
FIG. 9 is a diagram illustrating further details of the arrangement of emission LEDs and photodetectors shown in FIG. 7.

In some embodiments, each of the N blocks may consist of N LEDs, each configured for producing a different color or wavelength of light. The N differently colored LEDs within each block are arranged to form a polygon having N sides. For example, if N=3, the 3 differently colored LEDs (e.g., RGB) within each block would be arranged to form a triangle. If N=4, the 4 differently colored LEDs (e.g., RGBW or RGBY) within each block would be arranged to form a square, and so on. The N blocks of N LEDs are further arranged in a pattern on the substrate 60 of the emitter module 25, so as to form an outer polygon having N sides and an inner polygon also having N sides. If N=3, the inner and outer polygons form triangles, and if N=4, the inner and outer polygons form squares. One skilled in the art would understand how different polygons may be formed when N>4. FIGS. 8-9 illustrate this concept.

In FIG. 8, three blocks 70 of three differently colored LEDs (e.g., RGB) 34 are arranged in a triangular pattern. The three blocks of three LEDs are arranged on the substrate, such that: one LED within each block is located on a different vertex of the inner triangle 72, and the remaining LEDs within each block are located along the three sides of the outer triangle 74. To improve color mixing within the emitter module, the three blocks 70 of LEDs are arranged, such that the LEDs located on the vertices of the inner triangle 72 are each configured to produce a different color of light (e.g., RGB), and the LEDs located along each side of the outer triangle 74 are also each configured to produce a different color of light (e.g., RGB).

In FIG. 9, four blocks 80 of four differently colored LEDs (e.g., RGBW) 34 are arranged in a square pattern. The four blocks of four LEDs are arranged on the substrate, such that: one LED within each block is located on a different vertex of the inner square 82, and the remaining LEDs within each block are located along the four sides of the outer square 84. As in the previous embodiment, the four blocks 80 of LEDs are arranged, such that the LEDs located on the vertices of the inner square 82 are each configured to produce a different color of light (e.g., RGBW), and the LEDs located along each side of the outer square 84 are also each configured to produce a different color of light (e.g., RGBW).

The configurations shown in FIGS. 8-9 spatially scatter the differently colored chains of LEDs across the substrate 60 to improving color mixing in the illumination device. In order to provide an accurate measurement of the total light output by each LED chain, each of the embodiments shown in FIGS. 8-9 includes N photodetectors 35, which are mounted on the substrate 60, encapsulated within the dome 61 and arranged around the outer polygons 74/84, such that each photodetector 35 is placed substantially at the center of each side of the outer polygons 74/84. As noted above, the N photodetectors 35 are electrically connected in parallel to receiver 33 for detecting a portion of the illumination emitted by each individual LED chain. By connecting the N photodetectors 35 in parallel with the receiver 33, the photocurrents induced on each of the N photodetectors are summed to minimize spatial variation between the similarly colored LEDs, which are scattered across the substrate.

The photocurrents induced in the N photodetectors 35 by the emission LEDs 34 are measured for each LED chain, one chain at a time, to obtain a sum of photocurrents that is representative of the total light output from each LED chain. Exemplary methods for measuring such photocurrents are described, e.g., in U.S. patent application Ser. Nos. 14/314,580 and 14/471,081.

In one example, drive circuitry (e.g., LED drivers 32, FIG. 3) within the illumination device may be coupled for driving the N chains of serially connected LEDs with respective drive currents substantially continuously to produce illumination, and for periodically turning the N chains of serially connected LEDs off for short durations of time to produce periodic intervals. During the periodic intervals, the drive circuitry may be configured for supplying a respective drive current to each LED chain, one chain at a time, to produce illumination from only one LED chain at a time. The receiver circuitry (e.g., receiver 33, FIG. 3) within the illumination device is coupled to the N photodetectors 35 for detecting a sum of the photocurrents, which are induced in the N photodetectors 35 upon receiving a portion of the illumination produced by each LED chain, one chain at a time, during the periodic intervals. As noted above, the sum of photocurrents is representative of the total amount of the illumination produced by each LED chain, and also provides good spatial uniformity due to the spatial arrangement and parallel connection of the photodetectors 35. The photocurrents detected by the receiver circuitry are then forwarded to control circuitry (e.g., control circuit 31, FIG. 3), which utilizes the detected photocurrents (possibly along with other measurement values obtained during the periodic intervals) to adjust the drive currents supplied to one or more of the LED chains. The drive currents may be adjusted, in some embodiments, to achieve a desired intensity and/or a desired chromaticity for the illumination device, and/or to account for changes in drive current, temperature or LED aging effects.

Figure 10:
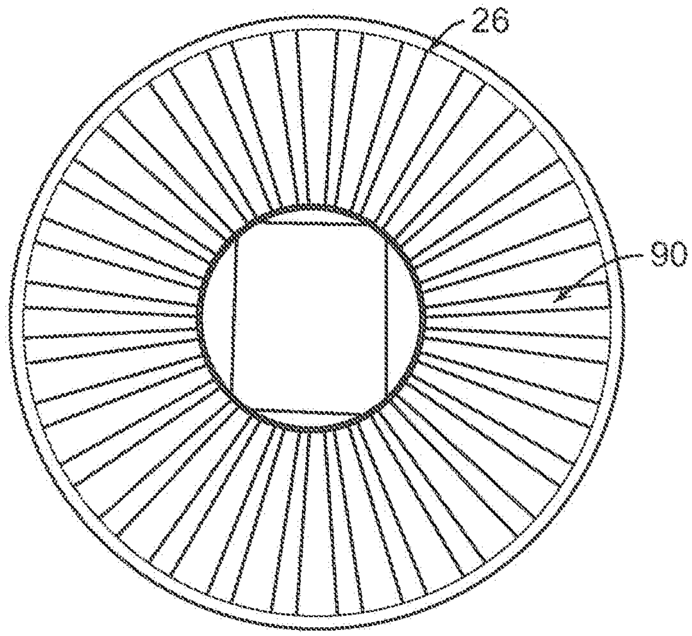
FIG. 10 is a picture of an exemplary reflector.

FIG. 10 is a picture of an exemplary reflector 26 with planar facets or lunes 90 that focus the light beam from emitter module 25 and contribute to mixing the color produced by emitter module 25. Reflector 26 is preferably an injection modeled polymeric but could comprise substantially any type of reflective material (such as aluminum or other types of metals) and may comprise substantially any shape. Lunes 90 are flattened segments in the otherwise round reflector 26 that slightly randomize the direction of the light rays from emitter module 25 and improve color mixing.

Figure 11:
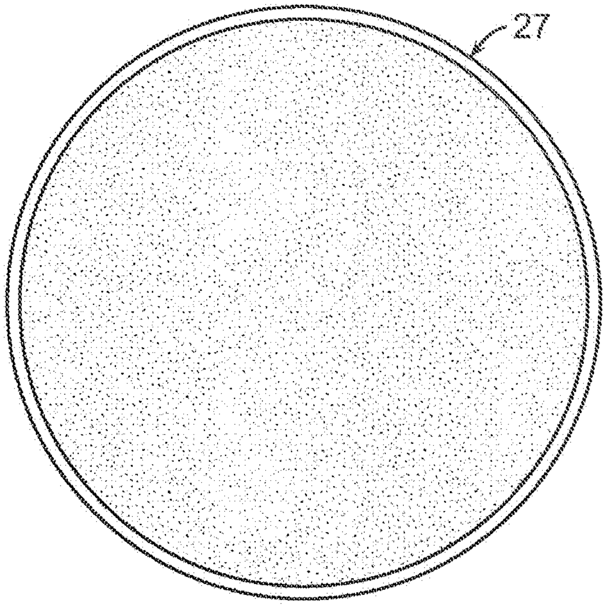
FIG. 11 is a picture of an exemplary exit lens.

FIG. 11 is a picture of an exemplary exit lens 27 having an array of lenslets formed on each side of the lens, wherein the array of lenslets formed on an interior side of the exit lens (i.e., the side adjacent to the emitter module 25) is configured with an identical aperture shape, but different dimensions, than the array of lenslets formed on the exterior side of the exit lens. Such an exit lens 27 may be otherwise referred to herein as double-sided pillow lens.

In some embodiments, the identical aperture shape of the lenslets formed on the interior side and the lenslets formed on the exterior side may be a polygon having N sides, wherein N is an even number greater than or equal to 4 (e.g., a square, hexagon, octagon, etc.). A polygon with an even number of straight sides is often desirable, since it provides a repeatable pattern of lenslets. However, the aperture shape is not limited to such a polygon and may be substantially circular in other embodiments.

The exit lens 27 is preferably designed such that the lenslets formed on the interior side are substantially larger (i.e., have an aperture with a larger diameter) than the lenslets formed on the exterior side. In some embodiments, the difference in size between the lenslets formed on the interior and exterior sides of the exit lens 27 may be described as an aperture ratio, which is defined as the diameter of the larger lenslets to that of the smaller lenslets.

In addition to aperture shape and size, the curvature of the individual lenslets, the alignment of the interior and exterior lenslet arrays and the material of the exit lens 27 may be configured to provide a desired beam shaping effect. For example, the curvature of the lenslets (defined by the radius of the arcs that create the lenslets) should be chosen to shape the beam and improve center beam intensity. In addition, the lenslet arrays on the interior and exterior sides of the exit lens 27 should be carefully aligned, such that a center of each of the larger lenslets formed on the interior side is aligned with a center of one of the smaller lenslets formed on the exterior side. Aligning the lenslet arrays in such a manner significantly improves center beam intensity, which is important for focused light applications. Since refractive index affects the angle at which light entering and exiting the lens is refracted, the refractive index of the material used to implement the exit lens 27 should also be considered when selecting the desired aperture shape, size and curvature of the lenslet arrays. According to one embodiment, exit lens 27 preferably comprises injection molded acrylic (e.g., PMMA) having a refractive index between about 1.45 and about 1.65, but could comprise substantially any material that is transparent to visible light.

Figure 12:
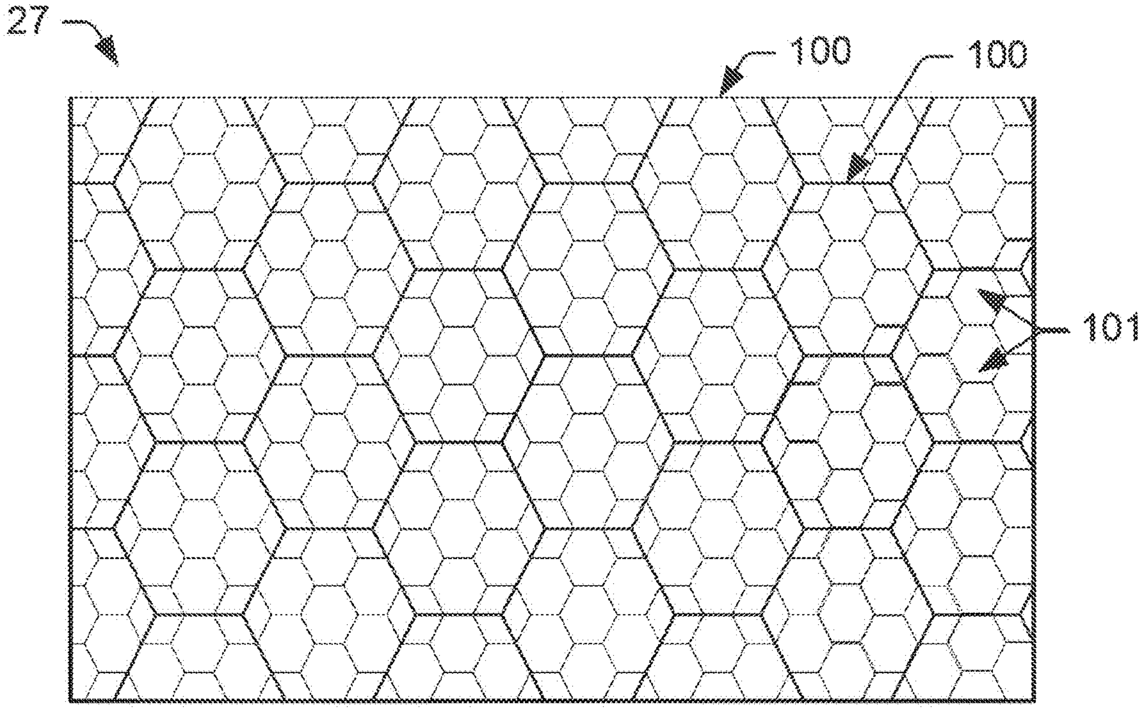
FIG. 12 is an exemplary drawing of a portion of an exit lens illustrating the structure of the lens as a double-sided pillow lens comprising an array of lenslets formed on each side of the lens, according to one embodiment.

FIG. 12 illustrates one embodiment of an exit lens 27 comprising an array of larger hexagonal lenslets 100 formed on an interior side, and an array of smaller hexagonal lenslets 101 formed on an exterior side of exit lens 27. It is noted that FIG. 12 illustrates only a portion of the exit lens 27 and is magnified significantly to illustrate the difference in aperture size and the alignment between the lenslet arrays on the interior and exterior sides of the exit lens. The solid lines in FIG. 12 illustrate the outline of the larger hexagonal lenslets 100 formed on the interior side, and the dotted lines illustrate the outline of the smaller hexagonal lenslets 101 formed on the exterior side of exit lens 27. In the exemplary embodiment of FIG. 12, an aperture ratio of the larger hexagonal lenslets 100 to the smaller hexagonal lenslets 101 is 3:1. In one example, the interior side of the exit lens 27 includes an array of approximately 3 mm diameter hexagonal lenslets 100, while the exterior side comprises an array of approximately 1 mm diameter hexagonal lenslets 101. Alternative diameters for the hexagonal lenslets formed on the interior and exterior sides may be appropriate, as long as the aperture ratio remains 3:1. As shown in FIG. 12, the lenslet arrays are preferably aligned, such that the center of each 3 mm diameter lenslet 100 on the interior side of the exit lens is aligned with the center of one of the 1 mm diameter lenslets 101 on the exterior side of the exit lens. Although such an alignment provides the advantage of improving the center beam intensity, it is not required in all embodiments.

Figure 13:
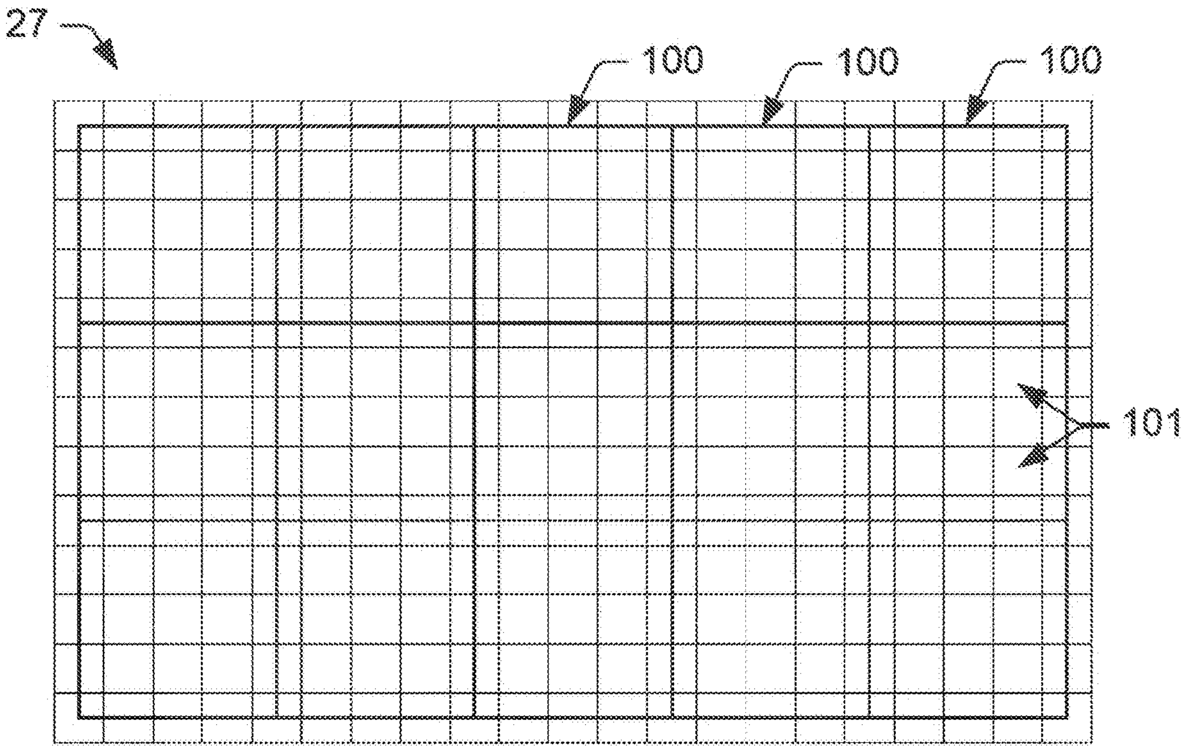
FIG. 13 is an exemplary drawing of a portion of an exit lens illustrating the structure of the lens as a double-sided pillow lens comprising an array of lenslets formed on each side of the lens, according to another embodiment.

FIG. 13 illustrates an alternative embodiment of an exit lens 27 comprising arrays of substantially square lenslets 100/101 formed on the interior and exterior sides of the exit lens 27. As with FIG. 12, FIG. 13 illustrates only a portion of the exit lens 27, which is magnified significantly to illustrate the difference in aperture size and the alignment between the lenslet arrays on the interior and exterior sides of the exit lens 27. The solid lines in FIG. 13 illustrate the outline of the substantially larger square lenslets 100 formed on the interior side, and the dotted lines illustrate the outline of the substantially smaller square lenslets 101 formed on the exterior side of exit lens 27. In one embodiment, an aperture ratio of the larger square lenslets 100 to the smaller square lenslets 101 is 4:1. In one example, the diameter of larger lenslets 100 may be 4 mm, and the diameter of the smaller lenslets 101 may be 1 mm. Alternative diameters for the square lenslets formed on the interior and exterior sides may be appropriate, as long as the aperture ratio remains 4:1. Like the previous embodiment, the arrays of square lenslets are aligned, such that the center of each larger lenslet 100 formed on the interior side is aligned with the center of one of the smaller lenslets 101 formed on the exterior side of the exit lens 27. However, such alignment is not required in all embodiments.

The lenslet arrays formed on each side of the double-sided exit lens 27 are not limited to the aperture shapes and sizes shown in the embodiments of FIGS. 12-13. In general, the aperture shape of the lenslet arrays may be substantially any polygon having N sides, wherein N is an even number greater than or equal to 4 (e.g., a square, hexagon, octagon, etc.), or may be substantially circular. When circular lenslets are used, the aperture ratio of the lenslets formed on the interior side to those on the exterior side may be 3:1 or 4:1. Other aperture ratios may be used to provide a desired result.

Regardless of aperture shape, the curvature of the lenslets may be chosen to shape the beam and improve center beam intensity. As noted above, the curvature of lenslets 100 and 101 is defined by the radius of the arcs that create lenslets 100 and 101. The curvature of the lenslets 100 and 101 may be described, in some cases, as a curvature ratio of the larger lenslets 100 formed on the interior side to the smaller lenslets 101 formed on the exterior side. In some embodiments, an appropriate curvature ratio may be within a range of about 1:10 to about 1:9. In one example, the radius of lenslets 100 is about 10 mm and the radius of lenslets 101 is about 1.2 mm. Alternative radii may be appropriate, as long as the curvature ratio remains within the desired range.

Although any combination of lenslets 100 and 101 size, shape and curvature are possible, the various shapes and dimensions described above have been shown to provide optimum color mixing and beam shaping performance. However, the exemplary dimensions mentioned above may only be valid when the exit lens 27 is formed from a material having a refractive index within a range of about 1.45 to about 1.65. Other curvature ratios and aperture ratios may be appropriate when using a material with a refractive index that falls outside of this range.

Figure 14:
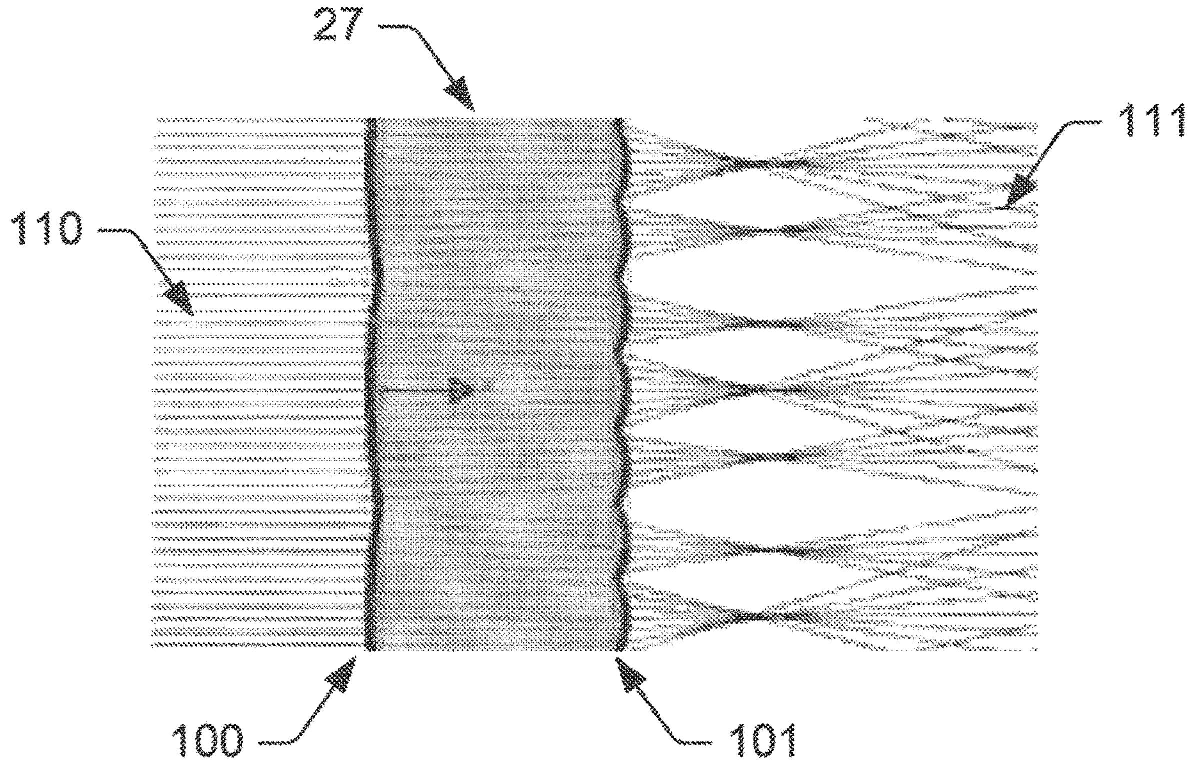
FIG. 14 is an exemplary ray diagram illustrating the color mixing effect of the exit lens.

FIG. 14 is a light ray diagram illustrating the color mixing and beam shaping effects of exit lens 27. As light rays 110 from emitter module 25 enter exit lens 27 from the left side of the figure, the larger lenslets 100 formed on the interior side of the exit lens 27 function to slightly redirect the light rays through the interior of the exit lens 27. The smaller lenslets 101 formed on the exterior side of the exit lens 27 focus the incident light rays differently, depending on the location of the individual smaller lenslets 101 relative to each larger lenslet 100. The effect of the dual sided exit lens 27 is improved color mixing, softer edges and improved center beam intensity for the resulting light beam 111.

FIGS. 11-14 illustrate just a few examples of possible dual-sided exit lens 27 with different lenslet 100 and 101 patterns on each side. In other embodiments, different aperture shapes and aperture ratios could be used. Likewise, the curvature of the lenslets 100 and 101 could change significantly and still achieve the desired results. The exit lens 27 described herein provides improved color mixing and smoother edges with any shape, any ratio of diameters, and any lenslet curvature by generally providing an array of lenslets on each side of the double-sided exit lens, wherein each array comprises an identical aperture shape, but different dimensions. The exit lens 27 described herein further improves center beam intensity by aligning the lenslet arrays, such that the center of each larger lenslet 100 formed on the interior side is aligned with the center of one of the smaller lenslets 101 formed on the exterior side of the exit lens 27.

It is further noted that other variations could also be implemented with respect to the above embodiments, as desired, and numerous variations and modifications will become apparent to those skilled in the art once the above disclosure is fully appreciated.

What is claimed is:

1. A light-emitting diode (LED) lamp, comprising:

a parabolic reflector having a plurality of lunes that extend from an entrance having a first diameter an exit having a second diameter greater than the first diameter;

an exit lens having the second diameter disposed transversely across the exit of the parabolic reflector;

wherein the exit lens includes:

a first plurality of lenslets disposed on a first surface of the lens internal to the parabolic reflector; and a second plurality of lenslets disposed on a second surface of the lens, the second surface of the exit lens disposed transversely across a thickness of the exit lens from the first surface of the exit lens;

wherein the first plurality of lenslets includes a lesser number of lenslets than the second plurality of lenslets; and a plurality of LED strings arranged to form an LED array on a substrate, the substrate disposed at a focal point of the parabolic reflector.

2. The LED lamp of claim 1 wherein each of the lenslets included in the first plurality of lenslets is configured with an identical aperture shape.

3. The LED lamp of claim 2 wherein each of the lenslets included in the second plurality of lenslets is configured with an identical aperture shape.

4. The LED lamp of claim 3 wherein a center of each of the lenslets included in the second plurality of lenslets disposed on the second surface of the exit lens is aligned with a center of a respective lenslet included in the first plurality of lenslets.

5. The LED lamp of claim 4, wherein the identical aperture shape of first plurality of lenslets and identical aperture shape of the second plurality of lenslets is a polygon having N sides, wherein Nis an even number greater than or equal to 4.

6. The LED lamp of claim 3, wherein the first plurality of lenslets and the second plurality of lenslets each comprise a square aperture shape, and wherein an aperture ratio of the first plurality of lenslets to the second plurality of lenslets is 4:1.

7. The LED lamp of claim 3, wherein the first plurality of lenslets and the second plurality of lenslets each comprise a hexagonal aperture shape, and wherein an aperture ratio of the first plurality of lenslets to the second plurality of lenslets is 3:1.

8. The LED lamp of claim 3, wherein the first plurality of lenslets and the second plurality of lenslets each comprise a circular aperture shape, and wherein an aperture ratio of the first plurality of lenslets to the second plurality of lenslets is 3:1 or 4:1.

9. The LED lamp of claim 1, wherein a curvature ratio of the first plurality of lenslets to the second plurality of lenslets is within a range of 1:10 to 1:9.

10. The LED lamp of claim 1, wherein the exit lens is formed from a material having a refractive index within a range of about 1.45 to about 1.65.

11. The LED lamp of claim 1 wherein each of the plurality of LED strings produce a different output spectrum.

12. The LED lamp of claim 11 wherein the LED strings are arranged to form an N-sided polygonal array on the surface of the substrate.

13. The LED lamp of claim 12, further comprising: a plurality of photodetectors that includes N photodetectors.

14. The LED lamp of claim 13 wherein each of the N photodetectors is disposed at a midpoint of each respective side of the N-sided polygonal array formed by the plurality of LED strings.

15. The LED lamp of claim 13, further comprising an optical structure disposed on a surface of the substrate, wherein the optical structure encapsulates the plurality of LED strings and the plurality of photodetectors.

16. The LED lamp of claim 15 wherein the optical structure comprises a hemispherical dome.

* * * * *